US012586326B2

(12) United States Patent
Wanbo et al.

(10) Patent No.: US 12,586,326 B2
(45) Date of Patent: \*Mar. 24, 2026

(54) MAPPING A REAL-WORLD ROOM FOR A SHARED ARTIFICIAL REALITY ENVIRONMENT

(71) Applicant: Meta Platforms Technologies, LLC, Menlo Park, CA (US)

(72) Inventors: Björn Wanbo, London (GB); Michael James Lebeau, Amsterdam (NL); William Arthur Hugh Steptoe, London (GB); Jonathan Mallinson, Chester (GB); Steven James Wilson, Seattle, WA (US); Vasanth Kumar Rajendran, London (GB); Vasyl Baran, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/731,869

(22) Filed: Jun. 3, 2024

(65) Prior Publication Data

US 2024/0320938 A1      Sep. 26, 2024

Related U.S. Application Data

(63) Continuation of application No. 17/936,521, filed on Sep. 29, 2022, now Pat. No. 12,100,111.

(51) Int. Cl.
*G06T 19/00*        (2011.01)
*G02B 27/01*        (2006.01)
        (Continued)
(52) U.S. Cl.
CPC ........ *G06T 19/006* (2013.01); *G02B 27/0172* (2013.01); *G06F 3/16* (2013.01);
        (Continued)

(58) Field of Classification Search
CPC ......... G06T 19/006; G06T 7/13; G06T 13/40; G06T 2219/024; G02B 27/0172;
        (Continued)

(56) References Cited

U.S. PATENT DOCUMENTS 6,002,853 A      12/1999   De Hond
6,079,982 A       6/2000   Meader
        (Continued)

FOREIGN PATENT DOCUMENTS

CN          118838527 A      10/2024
JP         2008065169 A       3/2008
        (Continued)

OTHER PUBLICATIONS

"Asynchronous Message-Based Communication," Microsoft, 2021, 7 pages, Retrieved from the Internet: URL: https://docs.microsoft.com/en-us/dotnet/architecture/microservices/architect-microservice-container-applications/asynchronous-message-based-communication.

(Continued)

*Primary Examiner* — Sarah Lhymn
(74) *Attorney, Agent, or Firm* — Dannon G. Allbee; Potomac Law Group, PLLC

(57)        ABSTRACT

A room manager can generate mappings for a real-world room that support a shared XR environment. For example, the real-world room can include real-world objects and surfaces, such as a table(s), chair(s), wall(s), door(s), window(s), etc. The room manager can generate XR object definitions based on information received about the real-world room, object(s), and surface(s). For example, the room manager can implement a flow that guides a user equipped with an XR system to provide information for the XR object definitions, such as real-world surfaces that map to the XR object(s), borders (e.g., measured using a com- (Continued)

ponent of the XR system), such as borders on real-world surfaces, semantic information (e.g., number of seat assignments at an XR table, size of XR objects, etc.), and other suitable information. Implementations generate previews of the shared XR environment, such as a local preview and a remote preview.

20 Claims, 37 Drawing Sheets

(51) Int. Cl.
|   |   |   |
|---|---|---|
| *G06F 3/16* | (2006.01) | |
| *G06T 7/13* | (2017.01) | |
| *G06T 13/40* | (2011.01) | |

(52) U.S. Cl.
CPC ............... *G06T 7/13* (2017.01); *G06T 13/40* (2013.01); *G02B 2027/0178* (2013.01); *G06T 2219/024* (2013.01)

(58) Field of Classification Search
CPC . G06F 3/16; G06F 3/011; G06F 3/165; G06F 3/167
See application file for complete search history.

(56) References Cited

U.S. PATENT DOCUMENTS

| | | | |
|---|---|---|---|
| 6,119,147 A | 9/2000 | Toomey et al. | |
| 6,179,619 B1 | 1/2001 | Tanaka | |
| 6,219,045 B1 | 4/2001 | Leahy et al. | |
| 6,362,817 B1 | 3/2002 | Powers et al. | |
| 6,396,522 B1 | 5/2002 | Vu | |
| 6,414,679 B1 | 7/2002 | Miodonski et al. | |
| 6,570,563 B1 | 5/2003 | Honda | |
| 6,573,903 B2 | 6/2003 | Gantt | |
| 6,784,901 B1 | 8/2004 | Harvey et al. | |
| 6,961,055 B2 | 11/2005 | Doak et al. | |
| 7,119,819 B1 | 10/2006 | Robertson et al. | |
| 7,414,629 B2 | 8/2008 | Santodomingo et al. | |
| 7,542,040 B2 | 6/2009 | Templeman | |
| 7,663,625 B2 | 2/2010 | Chartier et al. | |
| 7,746,343 B1 | 6/2010 | Charaniya et al. | |
| 7,788,323 B2 | 8/2010 | Greenstein et al. | |
| 7,804,507 B2 | 9/2010 | Yang et al. | |
| 7,814,429 B2 | 10/2010 | Buffet et al. | |
| 7,817,150 B2 | 10/2010 | Reichard et al. | |
| 7,844,724 B2 | 11/2010 | Van Wie et al. | |
| 8,266,536 B2 | 9/2012 | Roberts et al. | |
| 8,279,254 B2 | 10/2012 | Goose et al. | |
| 8,615,383 B2 | 12/2013 | Dobbins et al. | |
| 8,806,354 B1 | 8/2014 | Hyndman et al. | |
| 8,949,159 B2 | 2/2015 | Krishnakumar et al. | |
| 8,949,352 B2 | 2/2015 | Lewis et al. | |
| 9,038,127 B2 | 5/2015 | Hastings et al. | |
| 9,065,874 B2 | 6/2015 | Moyers et al. | |
| 9,244,533 B2 | 1/2016 | Friend et al. | |
| 9,616,338 B1 | 4/2017 | Hooper et al. | |
| 9,635,091 B1 | 4/2017 | Laukkanen et al. | |
| 9,696,795 B2 | 7/2017 | Marcolina et al. | |
| 9,836,595 B1 | 12/2017 | Goldberg et al. | |
| 9,996,797 B1 | 6/2018 | Holz et al. | |
| 10,015,212 B2 | 7/2018 | Sylvain | |
| 10,320,857 B2 | 6/2019 | Nichols et al. | |
| 10,345,989 B2 | 7/2019 | Da Costa et al. | |
| 10,347,040 B2 | 7/2019 | Boulkenafed et al. | |
| 10,516,853 B1 | 12/2019 | Gibson et al. | |
| 10,554,931 B1 | 2/2020 | Zavesky et al. | |
| 10,819,768 B2 | 10/2020 | Laukkanen et al. | |
| 10,838,574 B2 | 11/2020 | Agarawala et al. | |
| 11,048,376 B2 | 6/2021 | Srinivasan et al. | |
| 11,055,919 B2 | 7/2021 | Nattinger et al. | |
| 11,074,758 B2 | 7/2021 | Blanchflower et al. | |
| 11,093,103 B2 | 8/2021 | Agarawala et al. | |
| 11,095,468 B1 | 8/2021 | Pandey et al. | |
| 11,157,149 B2 | 10/2021 | Seeley et al. | |
| 11,157,739 B1 | 10/2021 | Iskandar et al. | |
| 11,176,756 B1 | 11/2021 | Bar-Zeev et al. | |
| 11,275,481 B2 | 3/2022 | Clausen et al. | |
| 11,302,085 B2 | 4/2022 | Lebeau et al. | |
| 11,302,088 B2 | 4/2022 | Driancourt et al. | |
| 11,315,569 B1 | 4/2022 | Talieh et al. | |
| 11,402,964 B1 | 8/2022 | Stevens et al. | |
| 11,450,051 B2 | 9/2022 | Assouline et al. | |
| 11,456,887 B1 | 9/2022 | Mccracken et al. | |
| 11,582,245 B2 | 2/2023 | Lebeau et al. | |
| 11,606,364 B2 | 3/2023 | Lebeau et al. | |
| 11,710,280 B1 * | 7/2023 | Durairaj ................. | G06T 17/00 |
| | | | 345/419 |
| 11,770,384 B2 | 9/2023 | Lebeau et al. | |
| 11,810,244 B2 | 11/2023 | Rockel et al. | |
| 11,886,625 B1 | 1/2024 | Trzynadlowski et al. | |
| 11,902,288 B2 | 2/2024 | Lebeau et al. | |
| 11,935,007 B1 | 3/2024 | Schamp et al. | |
| 12,003,889 B1 | 6/2024 | Rajasekar et al. | |
| 12,041,099 B2 | 7/2024 | Erasmus et al. | |
| 12,125,154 B1 | 10/2024 | Carrasco et al. | |
| 12,153,726 B1 | 11/2024 | Healey et al. | |
| 12,223,605 B2 | 2/2025 | Greunke | |
| 2001/0018667 A1 | 8/2001 | Kim | |
| 2002/0113820 A1 | 8/2002 | Robinson et al. | |
| 2003/0005177 A1 | 1/2003 | Duran et al. | |
| 2004/0113887 A1 | 6/2004 | Pair et al. | |
| 2004/0193441 A1 | 9/2004 | Altieri | |
| 2005/0093719 A1 | 5/2005 | Okamoto et al. | |
| 2005/0128212 A1 | 6/2005 | Edecker et al. | |
| 2007/0011273 A1 | 1/2007 | Greenstein et al. | |
| 2008/0030429 A1 | 2/2008 | Hailpern et al. | |
| 2008/0059570 A1 | 3/2008 | Bill | |
| 2008/0125218 A1 | 5/2008 | Collins | |
| 2008/0246693 A1 | 10/2008 | Hailpern et al. | |
| 2009/0076791 A1 | 3/2009 | Rhoades et al. | |
| 2009/0091583 A1 | 4/2009 | McCoy | |
| 2009/0113066 A1 | 4/2009 | Van Wie et al. | |
| 2009/0119604 A1 | 5/2009 | Simard et al. | |
| 2009/0287728 A1 | 11/2009 | Martine et al. | |
| 2009/0300528 A1 | 12/2009 | Stambaugh | |
| 2010/0011072 A1 | 1/2010 | Mishchenko | |
| 2010/0070378 A1 | 3/2010 | Trotman et al. | |
| 2010/0115428 A1 | 5/2010 | Shuping et al. | |
| 2010/0205541 A1 | 8/2010 | Rapaport et al. | |
| 2010/0214226 A1 | 8/2010 | Brown et al. | |
| 2010/0214284 A1 | 8/2010 | Rieffel et al. | |
| 2010/0274567 A1 | 10/2010 | Carlson et al. | |
| 2010/0274627 A1 | 10/2010 | Carlson | |
| 2010/0318399 A1 | 12/2010 | Li et al. | |
| 2010/0332998 A1 | 12/2010 | Sun et al. | |
| 2011/0010636 A1 | 1/2011 | Hamilton, II et al. | |
| 2011/0041083 A1 | 2/2011 | Gabai et al. | |
| 2011/0113351 A1 | 5/2011 | Phillips | |
| 2012/0192088 A1 | 7/2012 | Sauriol et al. | |
| 2012/0204118 A1 | 8/2012 | Lefar et al. | |
| 2012/0216131 A1 | 8/2012 | Moyers et al. | |
| 2012/0233555 A1 | 9/2012 | Psistakis et al. | |
| 2012/0249741 A1 | 10/2012 | Maciocci et al. | |
| 2012/0284640 A1 | 11/2012 | Sloyer et al. | |
| 2012/0302076 A1 | 11/2012 | Tsai | |
| 2013/0042296 A1 | 2/2013 | Hastings et al. | |
| 2013/0155169 A1 | 6/2013 | Hoover et al. | |
| 2013/0174213 A1 | 7/2013 | Liu et al. | |
| 2013/0335405 A1 | 12/2013 | Scavezze et al. | |
| 2014/0072143 A1 | 3/2014 | Liu et al. | |
| 2014/0082526 A1 | 3/2014 | Park et al. | |
| 2014/0123170 A1 | 5/2014 | Kummer | |
| 2014/0229865 A1 | 8/2014 | Da Costa et al. | |
| 2014/0282105 A1 | 9/2014 | Nordstrom | |
| 2015/0082195 A1 | 3/2015 | Berger et al. | |
| 2015/0332732 A1 | 11/2015 | Gilson et al. | |
| 2016/0179754 A1 | 6/2016 | Borza et al. | |
| 2016/0210602 A1 | 7/2016 | Siddique et al. | |
| 2016/0253842 A1 * | 9/2016 | Shapira ................. | G06T 19/006 |
| | | | 345/633 |
| 2016/0313790 A1 | 10/2016 | Clement et al. | |

(56) References Cited

U.S. PATENT DOCUMENTS

| | | |
|---|---|---|
| 2016/0314624 A1 | 10/2016 | Li et al. |
| 2017/0075509 A1 | 3/2017 | Dunne et al. |
| 2017/0124762 A1 | 5/2017 | Privault et al. |
| 2017/0132518 A1 | 5/2017 | Kitada et al. |
| 2017/0185261 A1 | 6/2017 | Perez et al. |
| 2017/0243403 A1 | 8/2017 | Daniels et al. |
| 2017/0262045 A1 | 9/2017 | Rouvinez et al. |
| 2017/0269713 A1 | 9/2017 | Marks et al. |
| 2017/0270930 A1 | 9/2017 | Ozmeral et al. |
| 2018/0004305 A1 | 1/2018 | Moseley et al. |
| 2018/0077099 A1 | 3/2018 | Silva et al. |
| 2018/0095542 A1 | 4/2018 | Mallinson |
| 2018/0129278 A1 | 5/2018 | Luchinskiy |
| 2018/0131907 A1 | 5/2018 | Schmirler et al. |
| 2018/0284982 A1 | 10/2018 | Veeramani et al. |
| 2018/0307303 A1 | 10/2018 | Powderly et al. |
| 2018/0336915 A1 | 11/2018 | Jalali et al. |
| 2018/0350150 A1 | 12/2018 | Powderly et al. |
| 2018/0357472 A1 | 12/2018 | Dreessen |
| 2019/0087015 A1 | 3/2019 | Lam et al. |
| 2019/0180509 A1 | 6/2019 | Laaksonen et al. |
| 2019/0273767 A1 | 9/2019 | Nelson et al. |
| 2019/0297039 A1 | 9/2019 | Rodriguez et al. |
| 2019/0310757 A1 | 10/2019 | Lee et al. |
| 2019/0310761 A1 | 10/2019 | Agarawala et al. |
| 2019/0313059 A1 | 10/2019 | Agarawala et al. |
| 2019/0327392 A1 | 10/2019 | Sarkar |
| 2019/0341050 A1 | 11/2019 | Diamant et al. |
| 2019/0355181 A1 | 11/2019 | Srinivasan et al. |
| 2019/0378076 A1 | 12/2019 | O'Gorman et al. |
| 2019/0394444 A1 | 12/2019 | Oh et al. |
| 2020/0098188 A1* | 3/2020 | Bar-Zeev ............. G02B 27/017 |
| 2020/0110928 A1 | 4/2020 | Al Jazaery et al. |
| 2020/0117267 A1 | 4/2020 | Gibson et al. |
| 2020/0117270 A1 | 4/2020 | Gibson et al. |
| 2020/0137140 A1 | 4/2020 | Laukkanen et al. |
| 2020/0151065 A1 | 5/2020 | Rinaldi et al. |
| 2020/0151965 A1 | 5/2020 | Forbes et al. |
| 2020/0175766 A1 | 6/2020 | Gawrys et al. |
| 2020/0210127 A1 | 7/2020 | Browy |
| 2020/0210137 A1 | 7/2020 | Noris et al. |
| 2020/0218350 A1 | 7/2020 | Coleman |
| 2020/0233681 A1 | 7/2020 | Garstenauer et al. |
| 2020/0279567 A1 | 9/2020 | Adlersberg et al. |
| 2020/0294313 A1* | 9/2020 | Arroyo Palacios ..... A63F 13/25 |
| 2020/0328908 A1 | 10/2020 | Howland et al. |
| 2020/0363929 A1 | 11/2020 | Srinivasan et al. |
| 2020/0371665 A1 | 11/2020 | Clausen et al. |
| 2020/0404177 A1 | 12/2020 | Sapienza et al. |
| 2021/0008413 A1 | 1/2021 | Asikainen et al. |
| 2021/0021439 A1 | 1/2021 | Gorny et al. |
| 2021/0041951 A1 | 2/2021 | Gibson et al. |
| 2021/0065455 A1 | 3/2021 | Beith et al. |
| 2021/0072947 A1 | 3/2021 | Anderson et al. |
| 2021/0096726 A1 | 4/2021 | Faulkner et al. |
| 2021/0144220 A1 | 5/2021 | Zavesky et al. |
| 2021/0165557 A1 | 6/2021 | Agarawala et al. |
| 2021/0255696 A1 | 8/2021 | Shuster et al. |
| 2021/0336784 A1 | 10/2021 | Athlur et al. |
| 2021/0349676 A1* | 11/2021 | Sommer ................. A63F 13/35 |
| 2021/0409547 A1 | 12/2021 | Channapragada et al. |
| 2022/0053218 A1 | 2/2022 | Malecki |
| 2022/0066620 A1 | 3/2022 | Anderson et al. |
| 2022/0070232 A1 | 3/2022 | Young |
| 2022/0084288 A1 | 3/2022 | LeBeau et al. |
| 2022/0084297 A1 | 3/2022 | Bar-Zeev et al. |
| 2022/0086167 A1 | 3/2022 | LeBeau et al. |
| 2022/0086205 A1 | 3/2022 | LeBeau et al. |
| 2022/0108538 A1 | 4/2022 | Bar-Zeev et al. |
| 2022/0113847 A1 | 4/2022 | Hong et al. |
| 2022/0115020 A1 | 4/2022 | Bradley et al. |
| 2022/0124125 A1 | 4/2022 | Punwani et al. |
| 2022/0172444 A1 | 6/2022 | LeBeau et al. |
| 2022/0197403 A1 | 6/2022 | Hughes et al. |
| 2022/0214743 A1 | 7/2022 | Dascola et al. |
| 2022/0221966 A1 | 7/2022 | Zionpour et al. |
| 2022/0222426 A1 | 7/2022 | Zionpour et al. |
| 2022/0253136 A1 | 8/2022 | Holder et al. |
| 2022/0253605 A1 | 8/2022 | Tan et al. |
| 2022/0277505 A1 | 9/2022 | Baszucki et al. |
| 2022/0317830 A1 | 10/2022 | Skuratowicz et al. |
| 2023/0091949 A1 | 3/2023 | Erasmus et al. |
| 2023/0094459 A1 | 3/2023 | Erasmus et al. |
| 2023/0136597 A1 | 5/2023 | Thiel |
| 2023/0164211 A1 | 5/2023 | Laukkanen et al. |
| 2023/0199147 A1 | 6/2023 | Desserrey et al. |
| 2023/0260224 A1 | 8/2023 | Greunke |
| 2023/0260228 A1 | 8/2023 | Jia et al. |
| 2023/0267922 A1 | 8/2023 | Siohan et al. |
| 2023/0315271 A1 | 10/2023 | Milne et al. |
| 2023/0316658 A1 | 10/2023 | Smith et al. |
| 2023/0350487 A1* | 11/2023 | Tan ........................ G06F 3/017 |
| 2023/0376515 A1 | 11/2023 | Tanikella |
| 2023/0394440 A1 | 12/2023 | Marshall et al. |
| 2023/0409770 A1 | 12/2023 | Luleci et al. |
| 2024/0005085 A1 | 1/2024 | Kukde et al. |
| 2024/0005612 A1 | 1/2024 | Yokokawa et al. |
| 2024/0007317 A1 | 1/2024 | Lundberg et al. |
| 2024/0013158 A1 | 1/2024 | Zahavi et al. |
| 2024/0015371 A1 | 1/2024 | Biswas et al. |
| 2024/0104864 A1 | 3/2024 | Mulliken et al. |
| 2024/0112412 A1 | 4/2024 | Wanbo et al. |
| 2024/0112413 A1 | 4/2024 | Wanbo et al. |
| 2024/0112414 A1 | 4/2024 | Wanbo et al. |
| 2024/0135619 A1 | 4/2024 | Peshkov et al. |
| 2024/0143266 A1 | 5/2024 | Weiss et al. |
| 2024/0211093 A1 | 6/2024 | Hughes et al. |
| 2024/0212290 A1 | 6/2024 | Hughes et al. |
| 2024/0241382 A1 | 7/2024 | Muldoon |
| 2024/0250955 A1 | 7/2024 | Lebeau et al. |
| 2024/0257415 A1 | 8/2024 | Mentis et al. |
| 2024/0297863 A1 | 9/2024 | Lovitt et al. |
| 2024/0305679 A1 | 9/2024 | Erasmus et al. |
| 2024/0305747 A1 | 9/2024 | Rajasekar et al. |
| 2024/0312073 A1 | 9/2024 | Palangie et al. |
| 2024/0320893 A1 | 9/2024 | Barnes et al. |
| 2024/0371059 A1 | 11/2024 | Pakes et al. |
| 2024/0428512 A1 | 12/2024 | Martins Andrade et al. |
| 2025/0088477 A1 | 3/2025 | Lovitt et al. |
| 2025/0218110 A1 | 7/2025 | Bagheri et al. |

FOREIGN PATENT DOCUMENTS

| | | |
|---|---|---|
| JP | 2009111511 A | 5/2009 |
| JP | 2016122392 A | 7/2016 |
| JP | 2018506098 A | 3/2018 |
| JP | 2019510321 A | 4/2019 |
| JP | 2020520498 A | 7/2020 |
| JP | 2024157533 A | 11/2024 |
| NO | 343601 B1 | 4/2019 |
| TW | 201118705 A | 6/2011 |
| WO | 2019059944 A1 | 3/2019 |
| WO | 2019199569 A1 | 10/2019 |
| WO | 2020005604 A1 | 1/2020 |
| WO | 2021101695 A1 | 5/2021 |
| WO | 2021190264 A1 | 9/2021 |
| WO | 2023086752 A1 | 5/2023 |
| WO | 2024254096 A1 | 12/2024 |

OTHER PUBLICATIONS

International Preliminary Report on Patentability for International Application No. PCT/US2021/050427, mailed Mar. 30, 2023, 15 pages.

International Search Report and Written Opinion for International Application No. PCT/US2021/050427, mailed Feb. 25, 2022, 19 pages.

Invitation to Pay Additional Fees for International Application No. PCT/US2021/050427, Jan. 4, 2022, 14 pages.

Kendall M., "Take Back Your Work Day with Asynchronous Communication," Vimeo Blog, 2021, 13 pages, Retrieved from the Internet: URL: https://vimeo.com/blog/post/how-asynchronous-communications-improve-efficiency/.

(56) References Cited

OTHER PUBLICATIONS

Non-Final Office Action mailed Aug. 4, 2023 for U.S. Appl. No. 17/540,179, filed Dec. 1, 2021, 14 pages.

Pakanen M., et al., "Nice To See You Virtually": Thoughtful Design and Evaluation of Virtual Avatar of the Other User in AR And VR Based Telexistence Systems, Entertainment Computing, Jan. 1, 2022, vol. 40, 16 pages.

"Synchronous vs. Asynchronous Communication: How to Use Both to Dominate Remote Work," TechSmith, [Retrieved on Jan. 5, 2022], 24 pages, Retrieved from the Internet : URL: https://www.techsmith.com/blog/synchronous-vs-asynchronous-communication/.

International Preliminary Report on Patentability for International Application No. PCT/US2023/031206, mailed Apr. 10, 2025, 9 pages.

International Preliminary Report on Patentability for International Application No. PCT/US2023/085513, mailed Jul. 3, 2025, 7 pages.

International Search Report and Written Opinion for International Application No. PCT/US2023/031206, mailed Nov. 23, 2023, 11 pages.

International Search Report and Written Opinion for International Application No. PCT/US2023/085513, mailed Mar. 12, 2024, 10 pages.

International Search Report and Written Opinion for International Application No. PCT/US2024/018855, mailed Jul. 22, 2024, 11 pages.

International Search Report and Written Opinion for International Application No. PCT/US2024/060395, mailed Mar. 31, 2025, 12 pages.

Jacobs K., et al., "Classification of Illumination Methods for Mixed Reality," Computer Graphics Forum, Mar. 1, 2006, vol. 25, No. 1, pp. 29-51.

Kamo H., et al., "Interlocked Surfaces: A Dynamic Multi-device Collaboration System," 2013, Springer, 2013, pp. 317-325.

Loscos C., et al., "Interactive Virtual Relighting of Real Scenes," IEEE Transactions on Visualization and Computer Graphics, Jan. 1, 2000, vol. 6, No. 4, pp. 289-305, Retrieved from the Internet URL: https://inria.hal.science/inria-00527523/document%3E.

Masoodian M., et al., "Deepdocument: Use of a Multi-Layered Display to Provide Context Awareness in Text Editing," Proceedings of the Working Conference on Advanced Visual Interfaces, May 25-28, 2004, pp. 235-239.

Notice of Allowance mailed May 10, 2023 for U.S. Appl. No. 17/675,852, filed Feb. 18, 2022, 8 pages.

Office Action mailed Jul. 1, 2025 for Japanese Patent Application No. 2023-509736, filed on Sep. 15, 2021, 4 pages.

International Preliminary Report on Patentability for International Application No. PCT/US2024/018855, mailed Nov. 13, 2025, 7 pages.

* cited by examiner

100

101
102
103

| Input Devices 120 | Display 130 | Other I/O 140 |

Processors
110

Memory
150

Program Memory 160

Operating System
162

Room Manager 164

Other Applications
166

Data Memory
170

274B
272D
272E
272F
276B 272C
272B
272A
274A
276A

270

400

410

412
processing
units 414
working
memory

416
I/O 418
storage
memory 420
mediator

430

432
interfaces 434
room mapping
coordinator 436
shared XR room
controller

438
XR object
controller 440
local manager 442
remote manager 444
occlusion mask
controller

600

502

602

1/3 Tap the table corner closest to the door

1300

1302

1304

1306

Five people present: 3 locals, 1 VR, 1 VC user (sees virtual environment and avatars)

Colocated user at
whiteboard, virtual user
chooses to relocate

2700B

2704

2708

_Ele Text_

2710

2702

2706

3002 identify RW desk contours

3004 determine dedicated space
on RW desk

3006 set XR anchors in relation to
dedicated space

3008 setup physically separate
RW space for XR whiteboard

3300

3302 render shared XR environment to users

3304 generate occlusion mask based on tracking and location data

3306 render avatar according to occlusion mask

MAPPING A REAL-WORLD ROOM FOR A SHARED ARTIFICIAL REALITY ENVIRONMENT

CROSS-REFERENCE TO RELATED APPLICATIONS

This application is a continuation of U.S. patent application Ser. No. 17/936,521, filed on Sep. 29, 2022, titled "Mapping a Real-World Room for a Shared Artificial Reality Environment," currently pending and which is hereby incorporated by reference in its entirety.

TECHNICAL FIELD

The present disclosure is directed to mapping a real-world room for configuring a shared artificial reality environment.

BACKGROUND

As the global marketplace increases, and challenges such as distributed teams and health concerns requiring social distancing become more prevalent, remote working and collaboration is becoming ever more common. Remote working typically involves an assortment of technologies such as remote access to shared documents, various texts-based communication services (e.g., email, instant message, text message, etc.), telephone communication, and video calling. Such remote working provides a number of benefits, such as reduced travel times, increased health and safety, and greater flexibility. However, remote workers face various challenges not experienced by their in-office counterparts. For example, video calls remain a pale imitation of face-to-face interactions. Understanding body language and context can be difficult with only a two-dimensional ("2D") representation of a sender. In addition, the limitation of video calling on a flat panel display introduces an intrusive layer of technology that can distract from communication and diminishes the perception of in-person communication. Remote workers often complain of missing out on the "watercooler" conversations, and often feel forgotten by their coworkers. Further, collaboration between teams in remote locations using traditional voice or 2D communication channels have been less effective than in-person experiences, e.g., with documents and whiteboard spaces that various participants can view and work on simultaneously.

Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Various XR environments exist, allowing representations of users to move about and speak with one another. However, such XR environments have not effectively been created to facilitate collaboration and do not integrate into workflows for remote workers.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
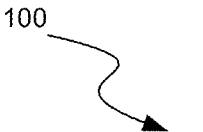
FIG. 1 is a block diagram illustrating an overview of devices on which some implementations of the present technology can operate.

Aspects of the present disclosure are directed to mapping a real-world room for configuring a shared artificial reality room. In some implementations, the real-world room can contain one or more real-world: table(s), chair(s), door(s), wall(s), window(s) and other suitable room elements. Implementations of a room manager can map the real-world room by capturing the room using one or more cameras (e.g., a three-dimensional volume of the room), instructing a user to navigate the room while equipped with an XR system, and by any other suitable mapping technique. In addition, implementations of the room manager can map precise locations for one or more real-world objects in the real-world room, such as a table. The precise locations can provide mappings for one or more XR objects that configure their location in an XR version of the room, such as an XR table. For example, the room manager can instruct a user to provide boundaries for objects when the user is wearing an XR system, such as a head-mounted display and hand-held controller that can physically designate locations.

A user can also provide semantic information to the room manager that defines at least a first horizontal flat surface in the real-world space (e.g., a flat surface of the table) as an XR table, one or more second horizontal flat surfaces in the real-world space (e.g., flat surfaces of chairs) as XR chair(s), a vertical flat surface in the real-world space (e.g., portions of a wall in the room) as an XR board, etc. In some implementations, the semantic information includes seat assignments at the XR table. Once a real-world room is mapped, the room manager can store the mapping definitions in association with the room. In some implementations, the room manager can compare the mapping definitions for the room to one or more validation criteria that define minimum requirements for mapping the room (e.g., one XR table, one XR board, one XR door, and one XR window). If the mapping definitions do not meet the validation criteria, one or more additional mappings can be generated (e.g., to add additional XR objects) and/or one or more existing mappings can be edited. Once the mapping definitions are determined to meet the validation criteria, the mapping definitions can be saved in association with the real-world room to support a shared XR environment.

In some implementations, prior to saving the mapping definitions for reuse, the room manager can display, to the user performing the mapping, a preview of multiple versions of a shared XR environment configured by the mapping definitions. For example, the multiple previews can be a local version of the shared XR environment for the real-world room according to the generated mapping definitions and a remote version of the shared XR environment for the real-world room according to the generated mapping definitions. For example, the preview of the local version can be a passthrough display or mixed reality visual of the real-world room augmented with XR objects according to the mapping definitions (e.g., augmented with an XR table at a location that corresponds to the XR table mapping definitions and an XR board at a location that corresponds to the XR board mapping definitions). In some implementations, the user performing the mapping that is displayed the preview of the local version can be physically located in the real-world room such that the passthrough/mixed reality visuals of the real-world room can be augmented with XR objects.

In some implementations, the preview of the remote version can be a virtual reality room that includes virtual objects that correspond to the mapping definitions (e.g., a virtual object version of the XR table and a virtual object version of the XR board). For example, the virtual reality room can include a geometry that corresponds to a geometry of the real-world room and relative locations for the XR table and the XR board within the virtual reality room that correspond to locations as defined in the mapping definitions for the XR table and the XR board. In some implementations, the preview of the remote version can be a virtual reality room that mimics the preview of the local version. In some implementations, after viewing the preview, the user can complete the mapping flow for the real-world room and store the mapping definitions for use to support shared XR environments.

In some implementations, using the mappings and semantic information, the room manager can generate a shared XR environment that corresponds to the real-world room. For example, the mapping definitions can be reused by multiple users to implement multiple shared XR environments hosted at the real-world room. The stored mapping definitions for a real-world room can also be edited, for example to update the locations of mappings for XR objects and/or configure the mappings according to a new layout. In some implementations, the room manager can coordinate multiple XR systems of multiple users to render A) a local version of the shared XR environment (e.g., that displays passthrough video capture of the real-world room or mixed reality visuals of the real-world room) to local users (e.g., users that are physically located in the real-world room) and B) a virtual reality (VR) version of the shared XR environment (e.g., that display a virtual room that corresponds to the real-world room) to remote users (e.g., users that are located in a physical space that is remote from the real-world room). For example, the shared XR environment can be an XR representation of the host real-world room that supports interactions among users that are both co-located (e.g., multiple local users) and remote from one another (e.g., at least one remote user).

In the local version of the shared XR environment (e.g., rendered by XR systems to local users), local users can be represented as passthrough video capture or mixed reality visuals of the users, while remote users can be represented as avatars (which may be computer generated drawings or video or holographic representations of the remote users). Because the local users are physically located in the real-world room, the passthrough video capture or mixed reality visuals of the real-world room itself supports the local user representation. On the other hand, remote users are not physically present in the real-world room, and thus passthrough video capture or mixed reality visuals of the real-world room are augmented with avatars to represent the remote users. In the remote version of the shared XR environment (e.g., rendered by XR systems to remote users), local users and remote users can both be represented by avatars. For example, the room manager renders a virtual room that corresponds to the real-world room in the remote version, and thus local user representations in captured passthrough video or mixed reality visuals are not available.

In the local version, XR systems of local users, can A) selectively mute audio for local users and permit passthrough real-world audio within the real-world room and B) output audio for remote users as spatial audio relative to the locations of the remote users within the shared XR environment. In the remote version, XR systems of remote users can output audio for both local users and remote users as spatial audio relative to the locations of the users within the shared XR environment.

In some implementations, both the remote version and the local version of a shared XR environment include an XR table and an XR board. For example, users can be seated at the XR table and users can interact with (e.g., draw on) the XR board such that the input at the XR board is rendered to the other users in the shared XR environment. In the local version, a local user can stand from the XR table (e.g., the table in the real-world room mapped to the XR table) and physically approach the XR board (e.g., the flat vertical surface in the real-world room mapped to the XR board) to interact with the XR board. On the other hand, remote users are not physically located in the real-world room, and thus cannot interact with the XR board in the same manner.

In some implementations, the remote user is located at a space remote from the real-world room that is accessible to the remote user, such as a home office or any other suitable space. Additional mappings for the XR board can be used to permit remote users to interact with the XR board in spaces remote from the real-world room. For example, the XR board can be mapped to a vertical surface at the remote space accessible to the remote user. In this example, the remote user can physically walk to the mapped vertical surface to interact with the XR board.

The room manager can also generate occlusion masks for virtual objects and/or artificial reality (XR) user representations in an XR environment. Occlusion masks can be virtual objects that, though do not have a visual appearance themselves, when they are placed in an XR environment between the user's point of view and a portion of a virtual object, that portion of the virtual object is not rendered to that user. The XR environment can correspond to captured passthrough video of a real-world room or mixed reality visuals of the real-world room, and the user presence (e.g., local user presence) in the XR environment can be represented by the passthrough video (or mixed reality visuals) of the user in the real-world room. For multiple physically co-located users in the real-world room (i.e., local users), the XR environment can be displayed in a passthrough or mixed-reality mode, where the users can view the real-world room with virtual object overlays. The location and pose of an avatar that corresponds to the local users can be tracked by each user's XR system, for example to manage interactions between the users' presence in the XR environment and virtual object(s)/user avatars in the XR environment.

The avatar location and pose data can be shared to other XR systems that render the XR environment. In some implementations, a recipient XR system can generate and attach an occlusion mask based on received avatar location and position data (even when the avatar for the local user is not displayed by the XR system in the XR environment). Consider two local users, each local user's xR system sharing avatar tracking information and pose data with the other.

In some implementations, a first of the XR systems for a first of the local users can generate (in the XR environment rendered to the first user) an occlusion mask and affix the occlusion mask to the second local user's position. In this example, portions of virtual object behind the second user (from the perspective of the first user) are selectively not be displayed due to the occlusion mask.

In some implementations, an XR board (e.g., virtual whiteboard) with virtual writing (e.g., rendered as an augment) can be present/rendered in the XR environment. Considering two local users with XR systems, a first of the local user's passthrough video presence or mixed reality visual presence may cause rendering errors if the first local user moves between the second local user and virtual writing on the XR board. For example, without the disclosed occlusion mask, the virtual writing may be incorrectly rendered over the presence of the first local user when the first local user is located in front of the XR board (from the perspective of the second local user). In this example, using tracking information and pose data for an avatar for the first user (though that avatar not displayed in the XR environment) shared by the first user'sxR system, the second user'sxR system can generate and implement an occlusion mask. For example, the second user'sxR system can generate and affix an occlusion mask to the first user's position according the shared avatar information, which causes portions of the virtual writing (e.g., portions behind the occlusion mask from the perspective of the second user) to not be rendered in the XR environment. Accordingly, an occlusion mask can block the rendering of the virtual writing from the XR board that is behind the user's location.

In some implementations, occlusion masks can be applied to objects (e.g., XR table, XR chairs, etc.) in the XR environment. For example, when the XR system of a local user renders the avatar of a non-local (i.e., "remote") user in the passthrough or mixed reality display, the occlusion mask applied to the objects can cause portions of the remote user's avatar to disappear, as if they were behind the objects. Occlusion masks can be applied to any suitable element in an XR environment to mitigate rendering errors.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Some conventional remote support systems can generate a shared XR experience for users, however these systems fail to support collaboration of local users and remote users. For example, some existing systems generate a virtual room, where each participant is an avatar. However, a virtual-only experience reduces the collaboration that real-world displays can achieve and does not support collaboration of co-located local users. Video calls and video meetings can permit real-world representations of users. However, these experiences are limited to two-dimensional representations and also fail to support collaboration of co-located users.

Implementations disclosed herein generate multiple versions of a shared XR environment: a local experience that permits collaboration among co-located users and a remote experience that permits remote users to participate in the collaboration. For example, because implementations use passthrough video captures or mixed reality visuals of the real-world room in the local version of the shared XR environment, local users can interact with real-world versions of other local users. Moreover, remote users can participate using a remote version of the shared XR environment that renders a virtual room that corresponds to the real-world room occupied by the local users. This virtual copy of the real-world room bridges the distance between the local users and remote users and permits a high level of interaction with remote users. Further, the split experience for remote users and local users means local users can take advantage of the collaborative opportunities presented by being co-located without excluding remote users.

Implementations also improve upon the mapping techniques for mapping a real-world room to support a shared XR environment. For example, a validation criteria is incorporated into the mapping flow to ensure that the mapping definitions received will support an effective shared XR environment. In addition, implementations display previews of both the local experience and remote experience given the mapping definitions. These previews enable the user performing the mapping to fully comprehend how the mapped real-world room will support shared XR environments, from the perspective of both local users and remote users.

Implementations also generate occlusion masks for the local version of the shared XR experience that can mitigate rendering problems. For example, a passthrough video capture or mixed reality visual of a real-world room that is augmented with virtual objects and/or remote user avatars can encounter rendering problems related to the depth of rendered augments when conventional techniques are utilized. However, implementations leverage the tracking of non-displayed user avatars that is performed by the XR systems worn by users to generate and place occlusion masks to mitigate against these rendering problems.

Several implementations are discussed below in more detail in reference to the figures. FIG. 1 is a block diagram illustrating an overview of devices on which some implementations of the disclosed technology can operate. The devices can comprise hardware components of a computing system 100 that map a real-world room for configuring a shared artificial reality room. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, room manager 164, and other application programs 166. Memory 150 can also include data memory 170 that can include, e.g., stored room mappings, XR object definitions, semantic information, user data, avatar tracking and pose data, occlusion mask data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
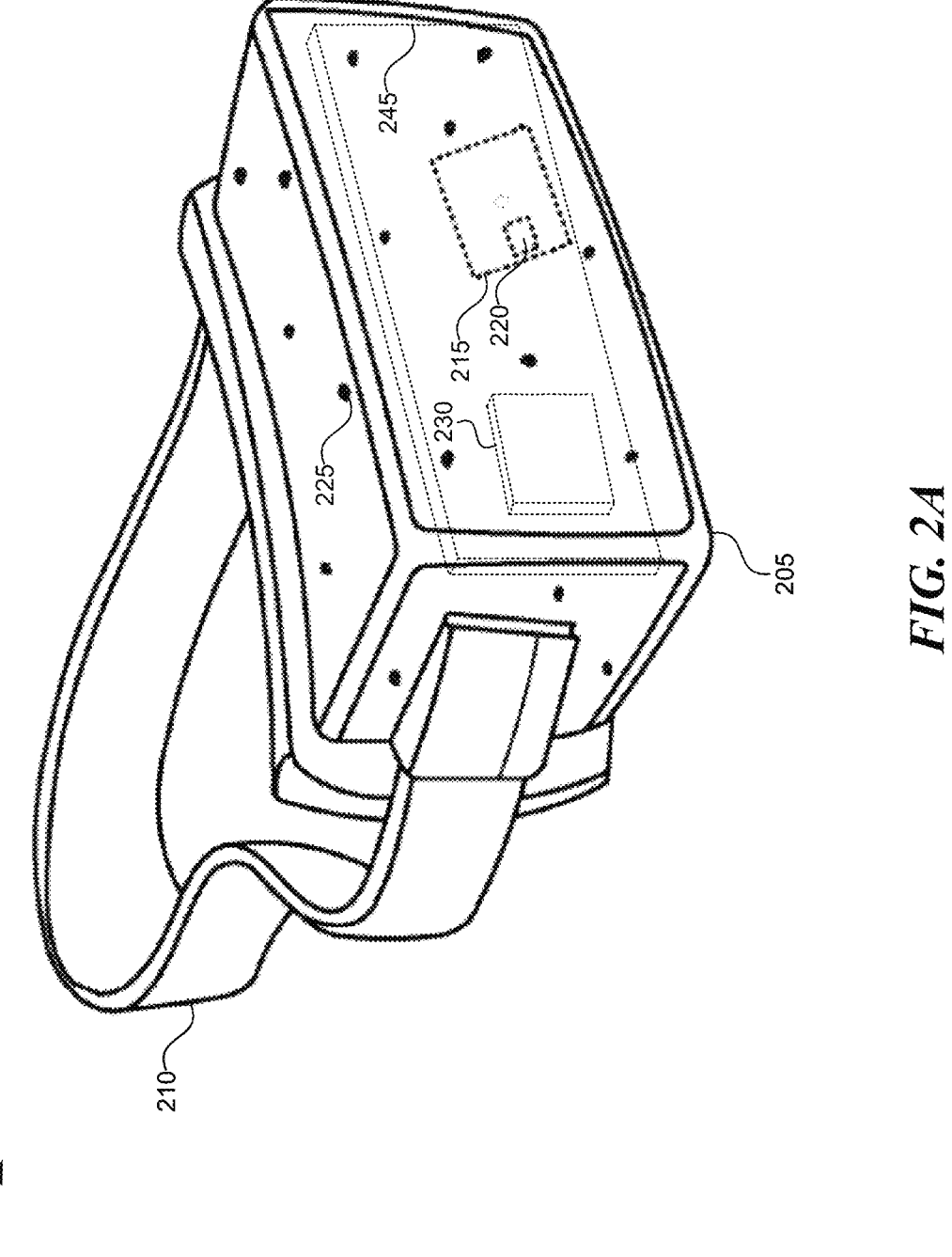
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
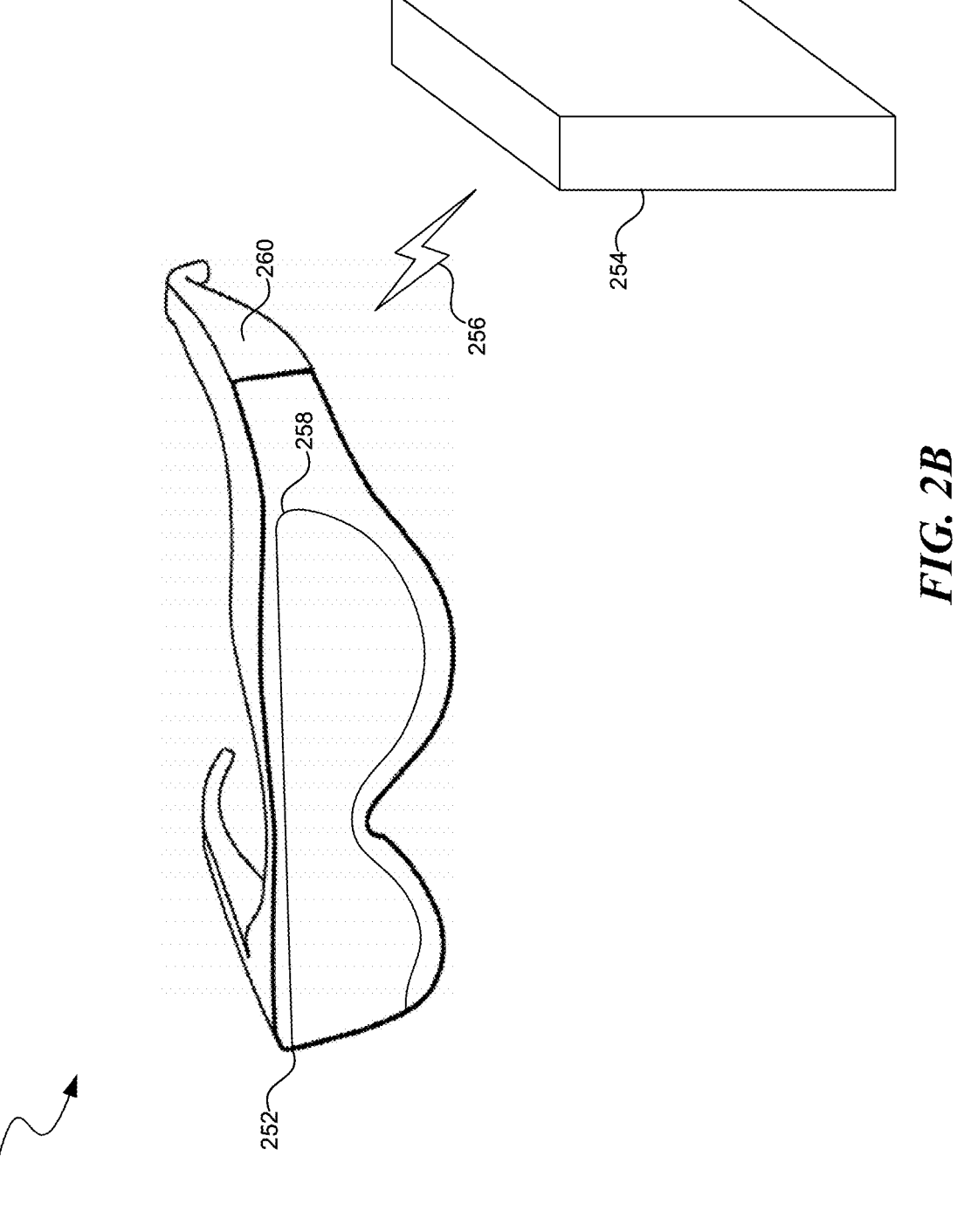
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
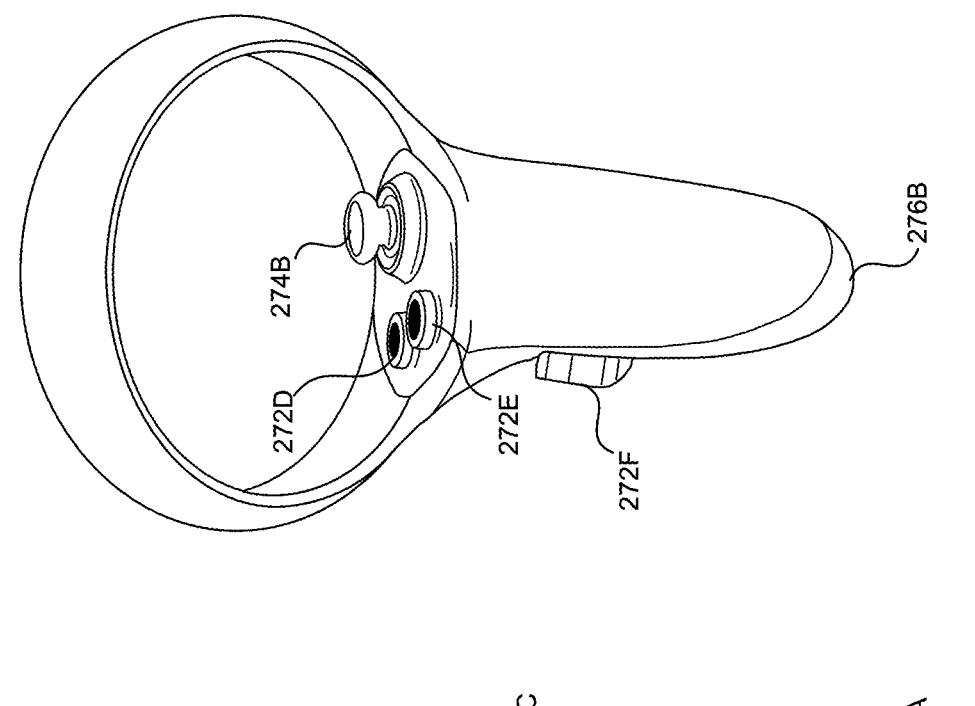
FIG. 2C is a wire diagram illustrating controllers which, in some implementations, a user can hold in one or both hands to interact with an artificial reality environment.
Figure 2C:
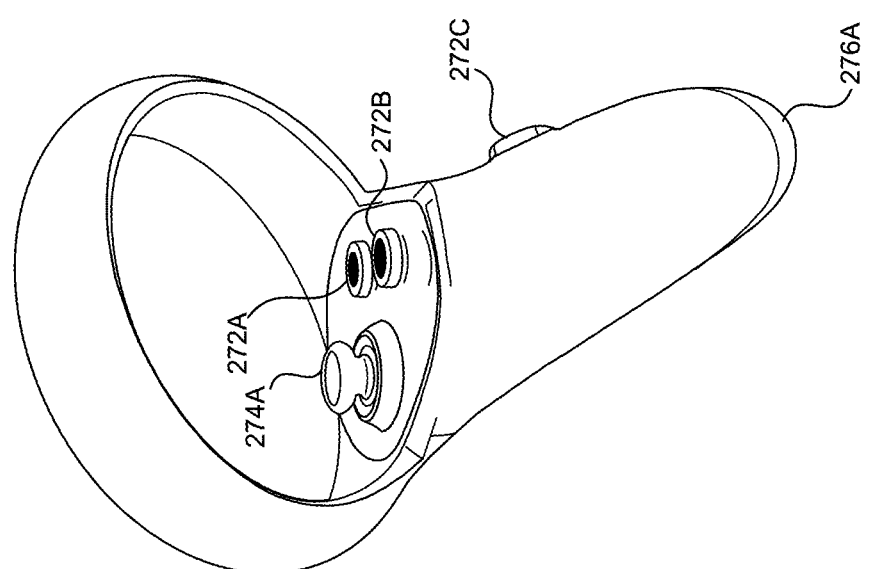
Figure 2C:
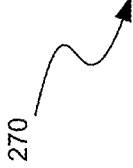

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
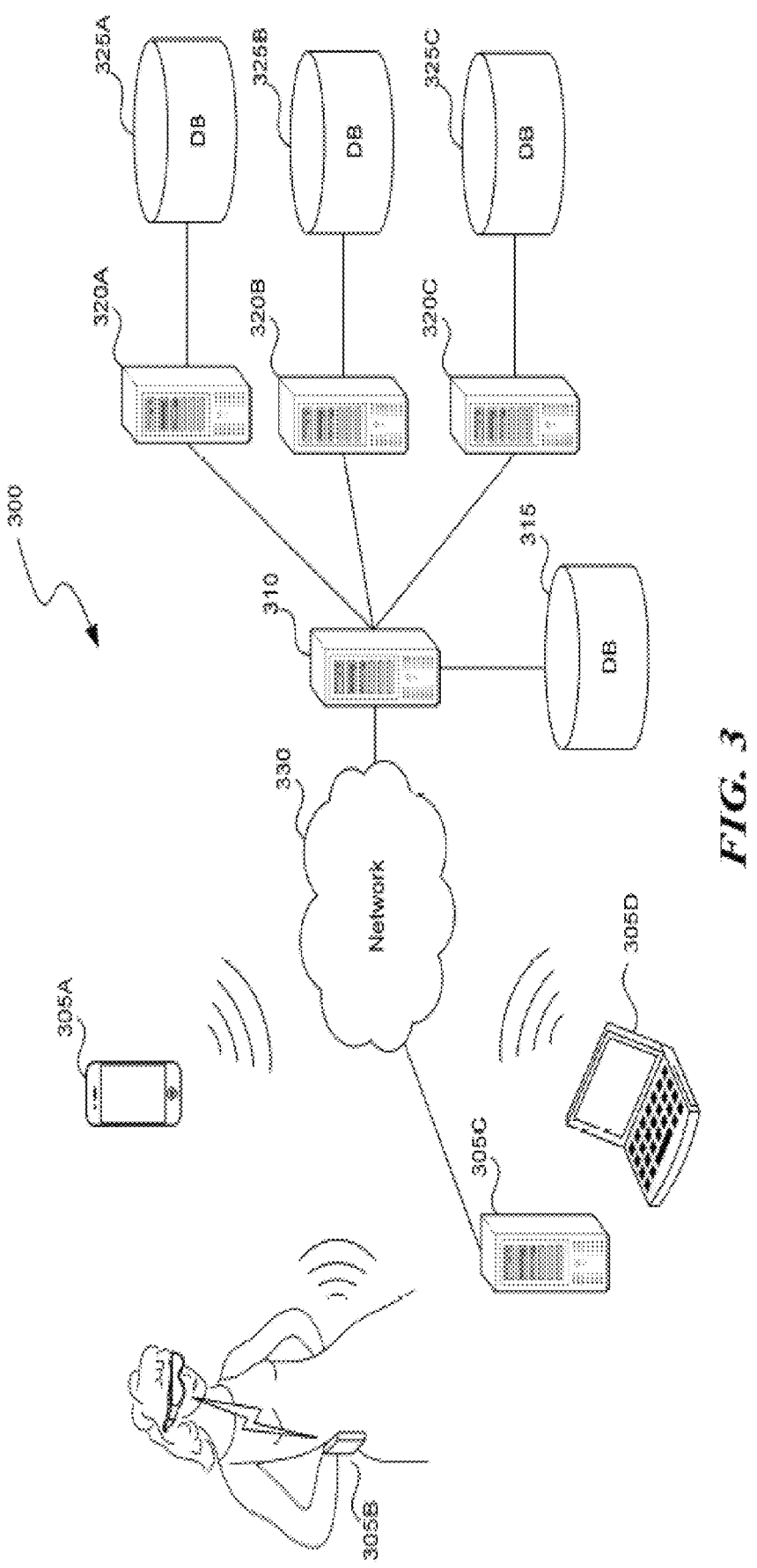
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
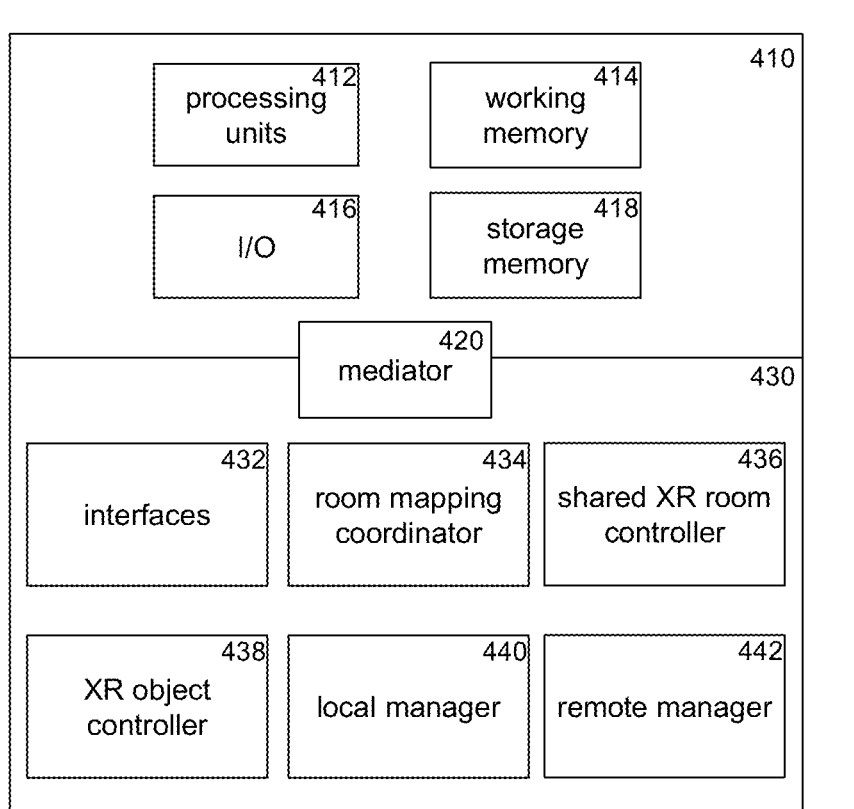
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for mapping a real-world room for configuring a shared artificial reality room. Specialized components 430 can include room mapping coordinator 434, shared XR room controller 436, XR object controller 438, local manager 440, remote manager 442, occlusion mask controller 444, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Room mapping coordinator 434 can generate mappings for a real-world room that support a shared XR room environment. For example, the real-world room can include real-world objects and surfaces, such as a table(s), chair(s), wall(s), door(s), window(s), and other suitable objects or surfaces. Room mapping coordinator 434 can generate XR object definitions based on information received about the real-world room, object(s), and surface(s). For example, room mapping coordinator 434 can implement a flow that guides a user equipped with an XR system to provide information for the XR object definitions, such as real-world surfaces that map to the XR object(s), borders that map to XR objects (e.g., measured using a component of the XR system), such as borders on real-world surfaces, semantic information (e.g., number of seat assignments at an XR table, size of XR objects, etc.), and other suitable information. Descriptions with references to FIGS. 5-11, 20, 29, and 30 further describe the functionality of room coordinator 434.

Shared XR room controller 436 can manage shared XR room environments. For example, a shared XR room can be hosted by a mapped real-world room according to mapping definitions, and shared XR room controller 436 can retrieve a stored mapping for a real-world room to initiate a shared XR room environment. Implementations of shared XR room controller 436 can initiate shared XR room environments among multiple users (e.g., remote users and local users), for example in response to a request from a user. Shared XR room controller 436 can also mange users participating in a shared XR environment, such as user invitations, privacy settings, security protocols, and other suitable functions. In some implementations, shared XR room controller 436 can interact with XR object controller 438 to manage XR objects within the shared XR room environment. In some implementations, shared XR room controller 436 can interact with local manager 440 to manage a local version of the shared XR room (e.g., version displayed to local users physically present in the real-world host room) and remote manager 442 to manage a remote version of the shared XR room (e.g., version displayed to remote users physically present in a space remote from the real-world host room).

XR object controller 438 can manage the display, tracking, and interactions of XR objects in a shared XR environment. For example, XR object controller 438 can configure XR objects according to stored object definitions of a real-world room mapping. Example XR objects include XR table(s), XR board(s), XR chair(s), XR window(s), XR door(s), XR screen(s), and other suitable XR objects. Mapping definitions for XR objects can include mapped real-world surfaces, boundaries at the mapped real-world surfaces, semantic information, and other suitable information to configure the display and functionality of an XR object in a shared XR environment. In some implementations, shared XR object controller 438 can interact with local manager 440 to manage a local version of the shared XR room (e.g., version displayed to local users physically present in the real-world host room) and remote manager 442 to manage a remote version of the shared XR room (e.g., version displayed to remote users physically present in a space remote from the real-world host room). Descriptions with references to FIGS. 12-17, 21-26, and 31 further describe the functionality of XR object controller 438.

Local manager 440 can manage local version(s) of a shared XR environment, such as a version that renders passthrough visuals (e.g., captured video) or mixed reality visuals of the real-world room that hosts the shared XR environment augmented with XR objects. For example, local manager 440 can render overlays on an XR table as a passthrough video captured in the real-world room of a table (e.g., mapped to the XR table) augmented with one or more augments or XR objects. In another example, local manager 440 can render an XR board as a passthrough video captured in the real-world room of a wall (e.g., mapped to the XR table) augmented with one or more augments or XR objects. Implementations of local manager 440 renders local users as captured passthrough visuals or mixed reality visuals of the users within the real-world room itself, and remote users as avatars (e.g., as computer generated drawings or captured and displayed images). In some implementations, local manager 440 renders the local version of the shared XR environment with the real-world background of the real-world room. Descriptions with references to FIGS. 12-17, 19, 21-26, and 31 further describe the functionality of local manager 440.

Remote manager 442 can manage remote version(s) of a shared XR environment, such as a version that renders a virtual room that corresponds to a host real-world room and renders XR objects as virtual objects according to stored object definitions. For example, remote manager 442 can render an XR table as a virtual object such that the relative location for the rendered XR table in the virtual room corresponds to the relative location of the real-world mapping defined in the stored object definition for the XR table within the real-world room. In another example, remote manager 442 can render an XR board as a virtual object such that the relative location for the rendered XR board in the virtual room corresponds to the relative location of the real-world mapping defined in the stored object definition for the XR board within the real-world room. Implementations of remote manager 442 render remote users as avatars. In some implementations, remote manager 442 renders the remote version of the shared XR environment with a virtual background. Descriptions with references to FIGS. 12-17, 18, 21-26, and 31 further describe the functionality of remote manager 442.

Occlusion mask controller 444 can generate, manage, and render occlusion masks, for example sized positioned according to a user's determined avatar pose/position (where the mask can be displayed whether or not the avatar is displayed) or attached to one or more virtual objects. For example, implementations render virtual augments (e.g., XR objects) alongside passthrough visuals (e.g., captured video of a real-world room) or mixed reality visuals. Due to this heterogenous environment, the relative depths of rendered elements can cause display errors, such as A) a virtual object, that is located behind a user rendered via passthrough, being rendered over the user or B) a user avatar rendered via passthrough that is located behind a virtual object that is rendered over the virtual object. Occlusion mask controller 444 can generate one or more occlusion masks that are affixed to non-displayed avatar locations and/or virtual objects to achieve rendering that accurately reflects the depths of the rendered elements. Descriptions with references to FIGS. 27A, 27B, 28A, 28B, 32, and 33 further describe the functionality of occlusion mask controller 446.

Figure 5:
FIG. 5 is a conceptual diagram that illustrates a representation of a real-world room for mapping in some implementations.

FIG. 5 is a conceptual diagram that illustrates a representation of a real-world room that is mapped in some implementations. Diagram 500 illustrates real-world room 502, which contains a table, a window, walls, and two occupants. Implementations can map real-world room 502 and store generated XR room configuration definitions. The stored XR room configuration definitions can then support a shared XR environment, using real-world room 502, that comprises a passthrough version for local users and an XR version for remote users.

Figure 6:
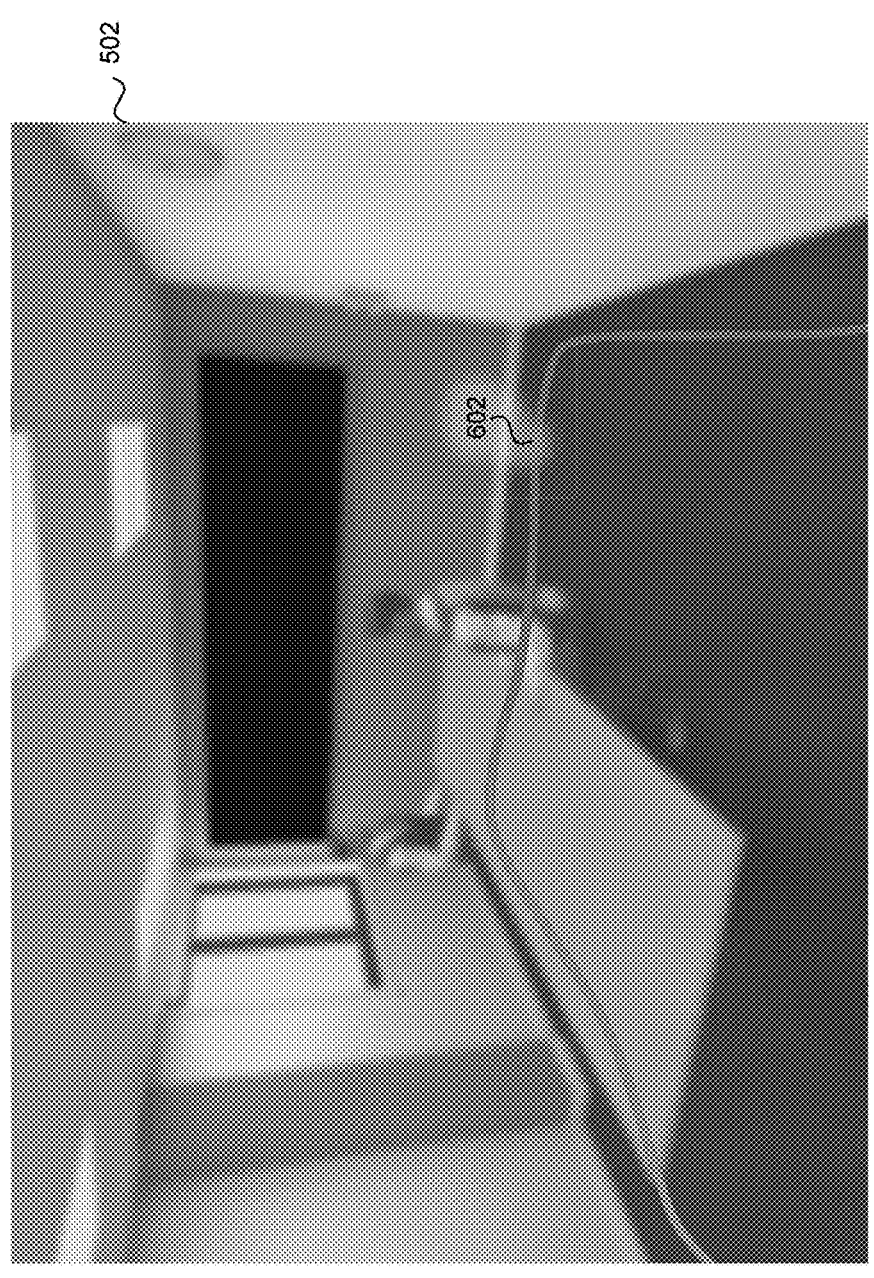
FIG. 6 is a conceptual diagram that illustrates room boundaries defined for a real-world room.

For example, room boundaries (e.g., a "guardian") can be mapped within real-world room 502. FIG. 6 is a conceptual diagram that illustrates room boundaries defined for a real-world room. Diagram 600 illustrates real-world room 502 and room boundary 602. Room boundary 602 represents the space within real-world room 502 that participates in the shared XR environment. For example, in the shared XR environment, virtual objects, avatars, other suitable versions of user presence, and/or any other XR elements can be located within room boundary 602. In some implementations, a Room scale flow can be used to measure out room boundary 602, such as by a user equipped with an XR device or system (e.g., HMD, controller, etc.). Any other suitable technique can be used to received room boundary 602.

Figure 7:
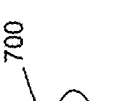
FIG. 7 is a conceptual diagram that illustrates a table surface definition for a table object located in a real-world room that is being mapped.
Figure 7:
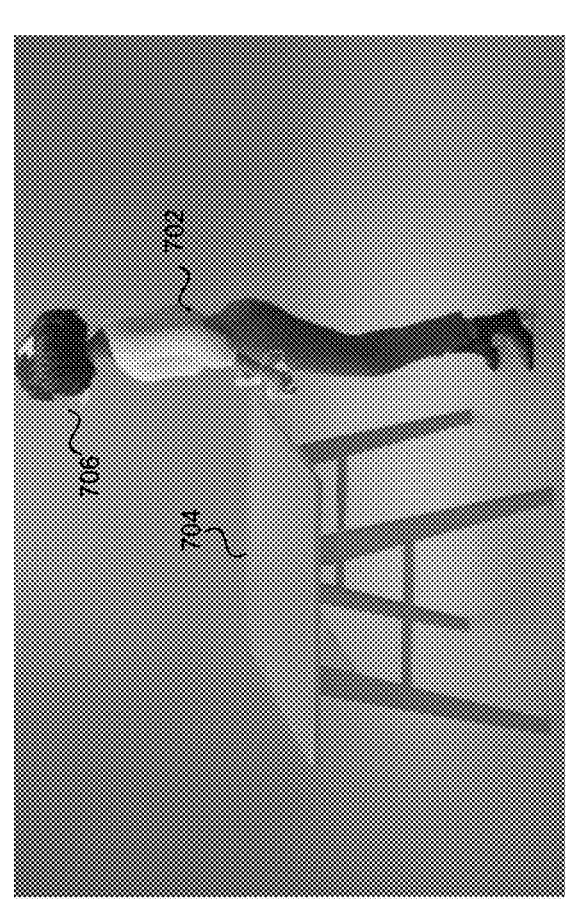
Figure 8:
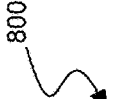
FIGS. 8, 9, and 10 are conceptual diagrams that illustrate measuring table boundaries using an XR device for a table object located in a real-world room that is being mapped.
Figure 9:
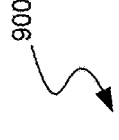
Figure 10:
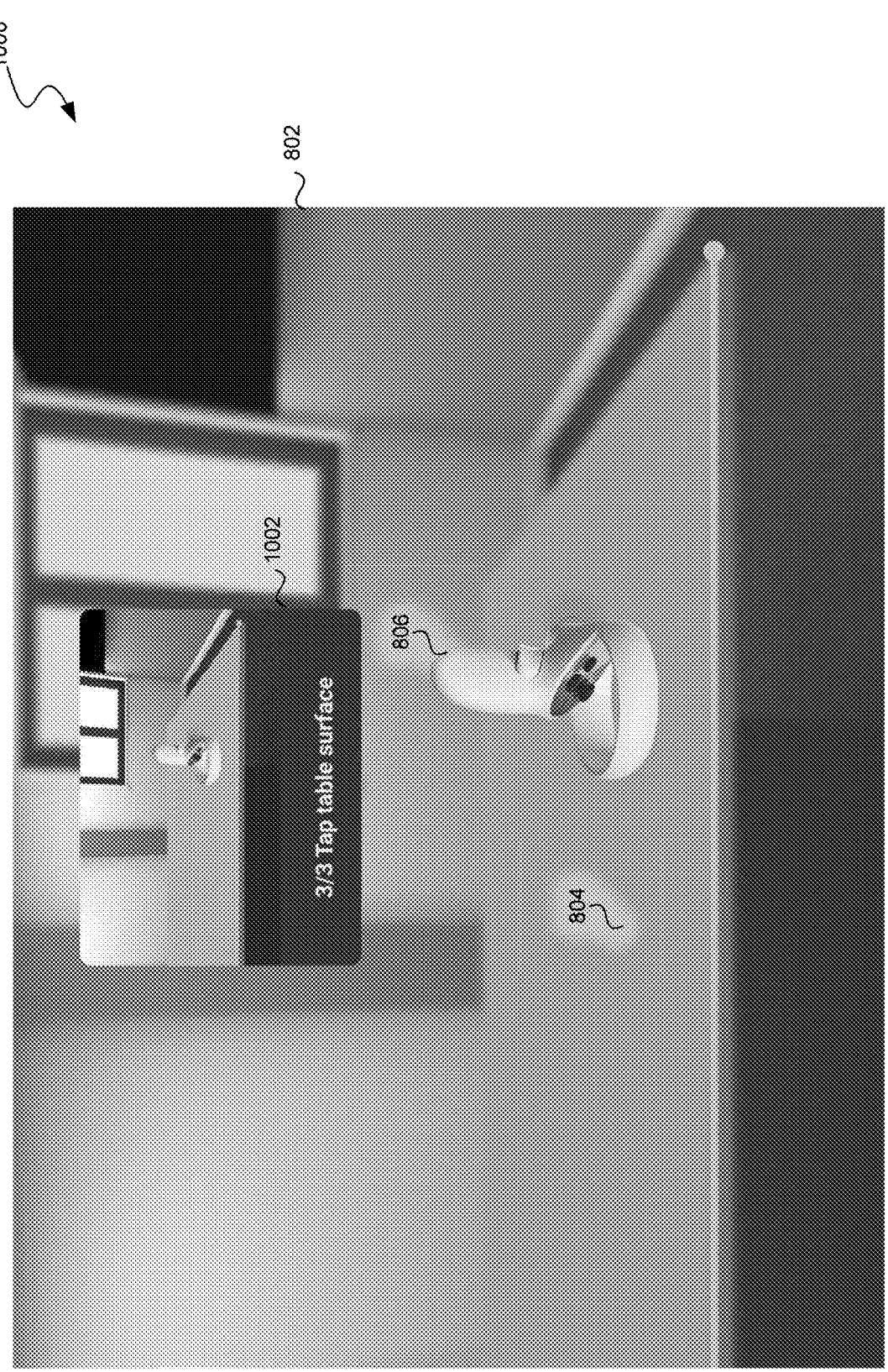
Figure 11:
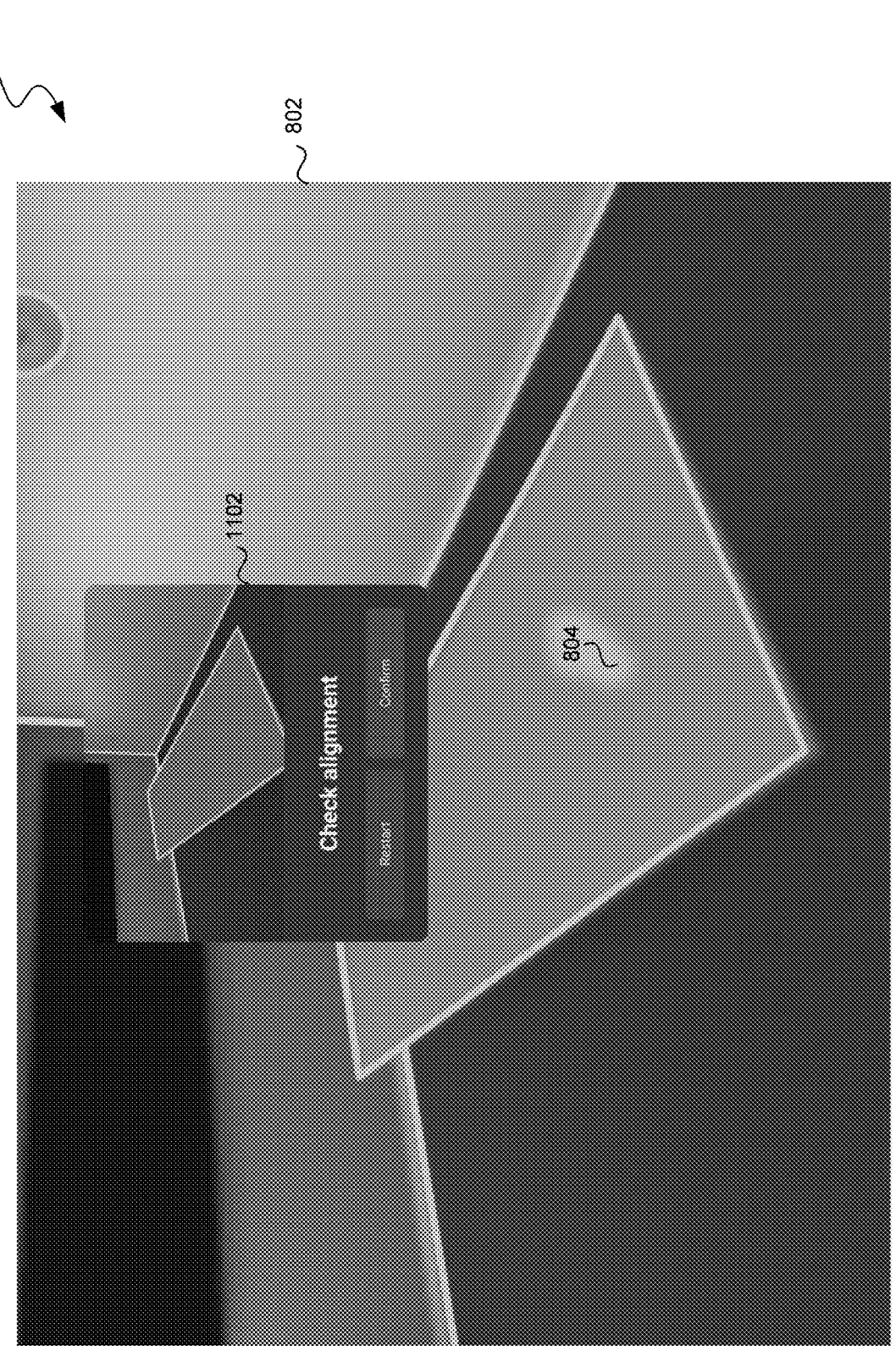
FIG. 11 is a conceptual diagram that illustrates alignment verification for a mapped table object located in a mapped real-world room.

In some implementations, mapping real-world room 502 includes receiving a selection and semantic information that define configuration(s) for an XR table. FIG. 7 is a conceptual diagram that illustrates a table surface definition located in a mapped real-world room. Diagram 700 illustrates user 702 and surface 704. In the illustrates example, user 702 is wearing an XR system (e.g., HMD and hand-held controller(s)) 706 that can be used to map out boundaries for surface 704. FIGS. 8, 9, 10, and 11 are conceptual diagrams that illustrate measuring table boundaries using an XR system a table object located in a mapped real-world room. Diagrams 800, 900, and 1000 illustrate real-world room 802, real-world surface 804, XR device 806, conceptual instructions 808, 902, and 1002, and interface element 1102.

In some implementations, an XR system can instruct a user, such as user 702 of FIG. 7, to perform one or more actions using the XR system (e.g., XR device 806) to measure the boundaries for the table object being configured. In diagram 800, the user is instructed to tap the corner of real-world surface 804 closest to the door in real-world room 802 using XR device 806, as illustrated by conceptual instruction 808. In diagram 900, the user is instructed to tap the corner of real-world surface 804 at the other end of real-world room 802 using XR device 806, as illustrated by conceptual instruction 902. In diagram 1000, the user is instructed to tap the surface of real-world surface 804 using XR device 806, as illustrated by conceptual instruction 1002.

In some implementations, using the signals received from XR device 806 and sensed conditions within real-world room 802 (e.g., visuals captured by one or more cameras), boundaries and an alignment can be generated for the table object. For example, as illustrated in diagram 1100, the XR system can display, to the user, the generated boundaries and alignment for the table object, and the user can compare the boundaries and alignment to the real-world surface 804. When the boundaries and alignment are acceptable, the user can provide confirmation using interface element 1102. Otherwise, the user can restart and perform the flow represented in diagrams 800, 900, and 1000 until acceptable boundaries and alignment are generated for the table object.

In some implementations, once verification is received from the user, the boundaries and alignment that indicate placement of the table object in real-world room 802 (e.g., along real-world surface 804), semantic information can be received from the user that defines the table object as an XR table. For example, the table object can be defined as a multi-person XR table, and one or more seat assignment can be generated for the defined XR table. For example, the user can input a number of seat assignments for the XR table and the XR table can be automatically segmented to generate the seat assignments (e.g., equal size placements, predefined sizes or size ranges, etc.). In another example, the user can measure seat assignments using XR device 806. The semantic information for the XR table can include the defined seat assignment segments.

In some implementations, a user can map other surfaces in a real-world room using elements of an XR system (e.g., XR device 806) to generate configuration definitions for other suitable objects, and semantic information can be received that defines these objects as XR room elements, such as one or more XR board(s), XR screen(s), XR chair(s), XR door(s), XR window(s), or other suitable XR elements. For example, an XR device can be used to measure boundaries on a flat vertical surface in the real-world room (e.g., real-world wall, real-world board, real-world screen, etc.) to define configuration definitions for a board object. The user can provide semantic information that defines the board object as an XR board, and the configuration definitions for the XR board can be stored.

In another example, the XR device can be used to measure boundaries on a flat vertical surface in the real-world room to define configuration definitions for a screen object (e.g., television, computer screen, etc.). The user can provide semantic information that defines the screen object as an XR screen, and the configuration definitions for the XR screen can be stored. In some implementations, an XR screen can be automatically placed when an XR table is mapped. For example, an XR screen can be automatically mapped to an end of the XR table relative to the seating segmentation for the XR table. In some implementations, the XR screen can be relocated/remapped by the user.

In another example, the XR device can be used to measure boundaries on a vertical surface (e.g., wall, real-world board, real-world door, etc.) in the real-world room to define configuration definitions for a door object. The user can provide semantic information that defines the door as an XR door, and the configuration definitions for the XR door can be stored. In another example, the XR device can be used to measure boundaries on a vertical surface (e.g., real-world wall, real-world board, real-world door, real-world window, etc.) in the real-world room to define configuration definitions for a window object. The user can provide semantic information that defines the window as an XR window, and the configuration definitions for the XR window can be stored. In some implementations, the XR door(s) and XR window(s) defined correspond to the real-world door(s) and window(s) in the real-world room. In this example, the XR doors and XR windows displayed to remote users in a VR version of a shared XR environment can include virtual doors and windows that corresponds to the real-world doors and windows displayed to local users in the pass-through version of the shared XR environment.

In another example, the XR device can be used to measure boundaries on a horizontal surface (e.g., chair, bench, etc.) in the real-world room to define configuration definitions for a chair object, such as the seat portion of the chair. The user can provide semantic information that defines the chair object as an XR chair, and the configuration definitions for the XR chair can be stored. In some implementations, virtual representations of the XR elements defined for a real-world room mapping are displayed to remote users in a VR version of a shared XR environment while the XR elements are represented using passthrough/mixed reality visuals of the real-world elements in the passthrough/local version of the shared XR environment.

In some implementations, a coordinator can automatically identify objects mapped from the real-world room (e.g., by the user wearing the XR system) and automatically generate semantic information that defines these objects as XR elements. For example, the coordinator can automatically label a table object, such as a horizontal flat surface that is a threshold size or meets dimension criteria, as an XR table. In another example, the coordinator can automatically label a board object, such as a vertical flat surface that is a threshold size or meets dimension criteria, as an XR board. In other examples, door objects (e.g., vertical surfaces that meets door sizing criteria and placement, such as adjacent to the floor), window objects (e.g., vertical surfaces that meet window sizing and placement criteria, such as floating/not adjacent to the floor), chair objects (e.g., horizontal surfaces that meet chair sizing and placement criteria, such as adjacent to a table object/XR table), and other suitable objects can be automatically labeled with semantic information that defines them as XR elements.

The configuration definitions for each of these XR elements can be stored as part of the mapping definitions for the real-world room. In some implementations, prior to the completion of a mapping flow, the mapping definitions for the real-world room can be compared to a validation criteria. The validation criteria can include a minimum set of XR elements, such as: a) one XR table, one XR board; b) one XR table, one XR board, one XR screen; c) one XR table, one XR board, one XR door, one XR window; d) one XR table, one XR board, at least two XR chairs; e) any combination thereof or any other suitable criteria.

When the mapping definitions for the real-world room meet the validation criteria, the real-world room mapping definitions can be stored for reuse. For example, the stored mapping definitions for the real-world room can be used to generate a shared XR environment for local users (e.g., pass-through version) and remote users (e.g., VR version). In some implementations, multiple users can initiate a shared XR environment using the stored mapping definitions for the real-world room. In some implementations, the mapping definitions for the real-world room can be edited. For example, a user can remap existing definitions (e.g., semantic information, boundaries, etc.), deleted previous mappings, add new mappings, etc. In this example, the edited mapping definitions can then be stored for reuse, for example to align the mapping of the real-world room with a reconfiguration of furniture.

In some implementations, the mapping definitions for the real-world room can restrict the elements in the real-world room that are rendered in the local version of a shared XR environment hosted in the real-world room. For example, a local version renders the real-world room using a captured passthrough or a mixed reality visual, however elements in the real-world room may be selectively displayed in the passthrough/mixed reality visual. For example, elements in the real-world room that are not explicitly included can be excluded from being rendered in the local version. In another example, certain groups, categories, or sets of room elements (e.g., elements on the walls) can be excluded from being rendered in the local version. In another example, a user can explicitly select room elements for exclusion from the local version.

Figure 12:
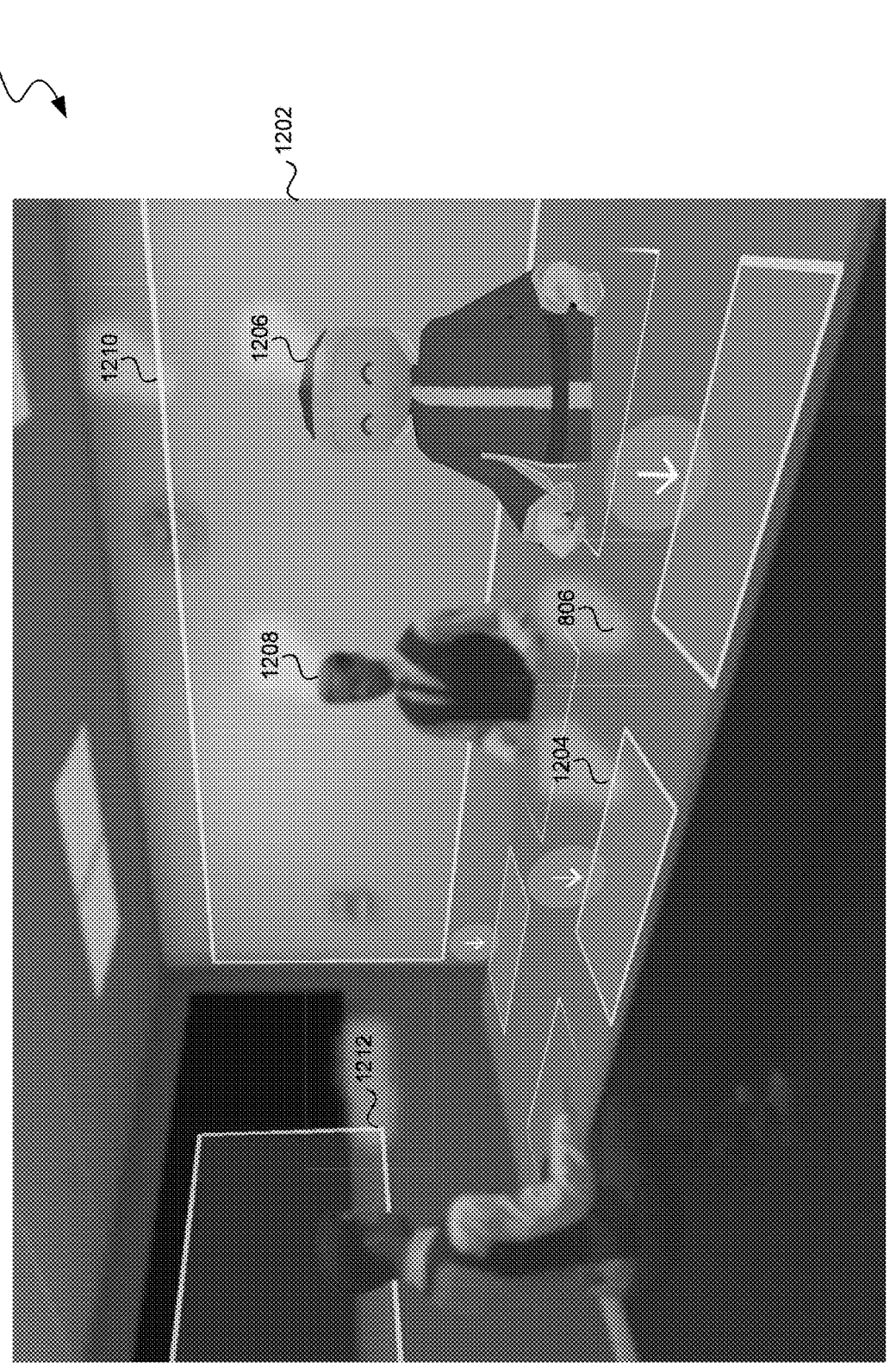
FIG. 12 is a conceptual diagram that illustrates local users and remote users within a shared XR environment that includes an XR table and XR board.
Figure 13:
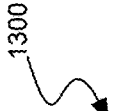
FIGS. 13-17 are conceptual diagrams that illustrate real-world movements and XR board interactions for a local user within a real-world room that is part of a shared XR environment.
Figure 14:
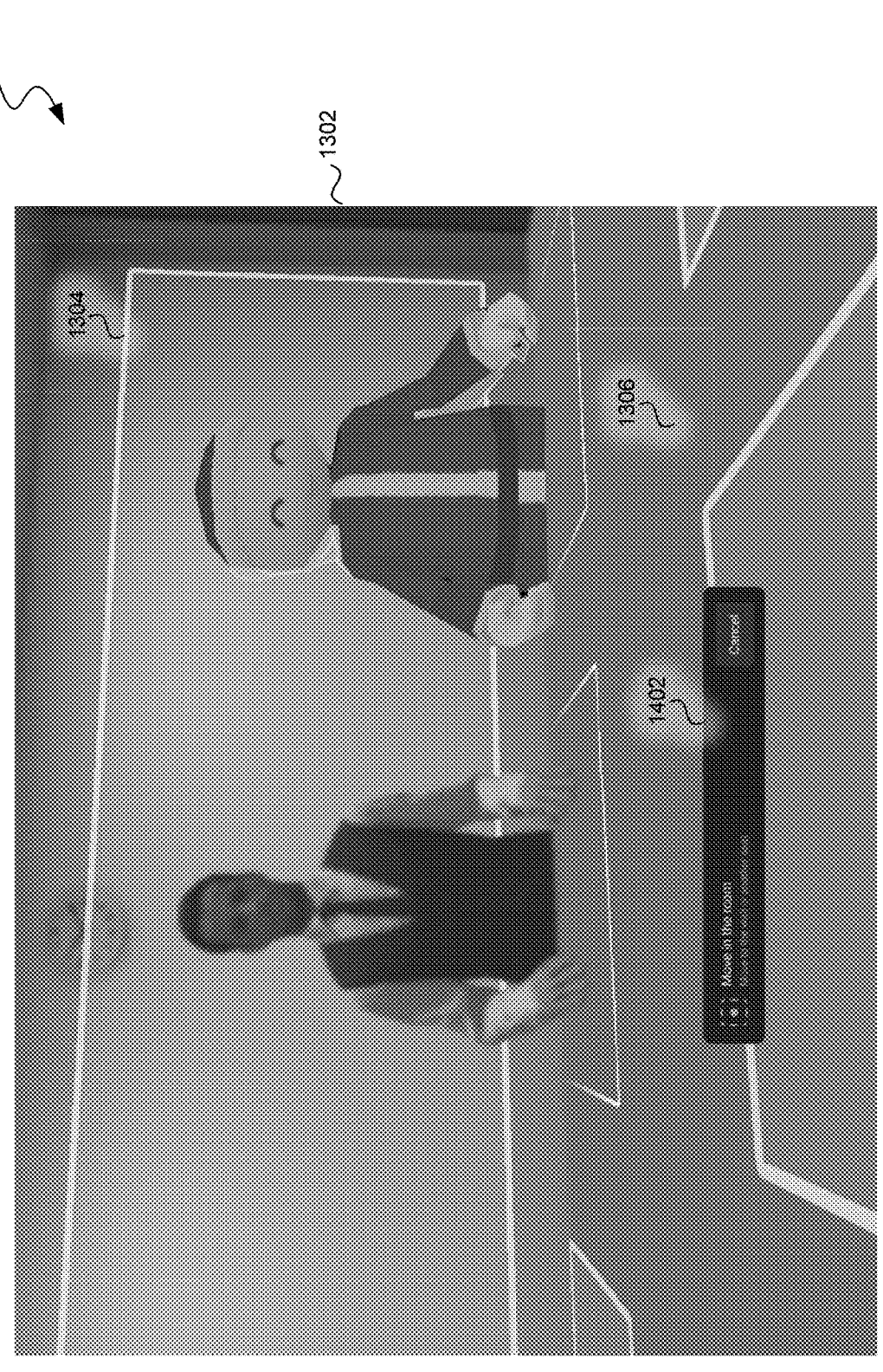
Figure 15:
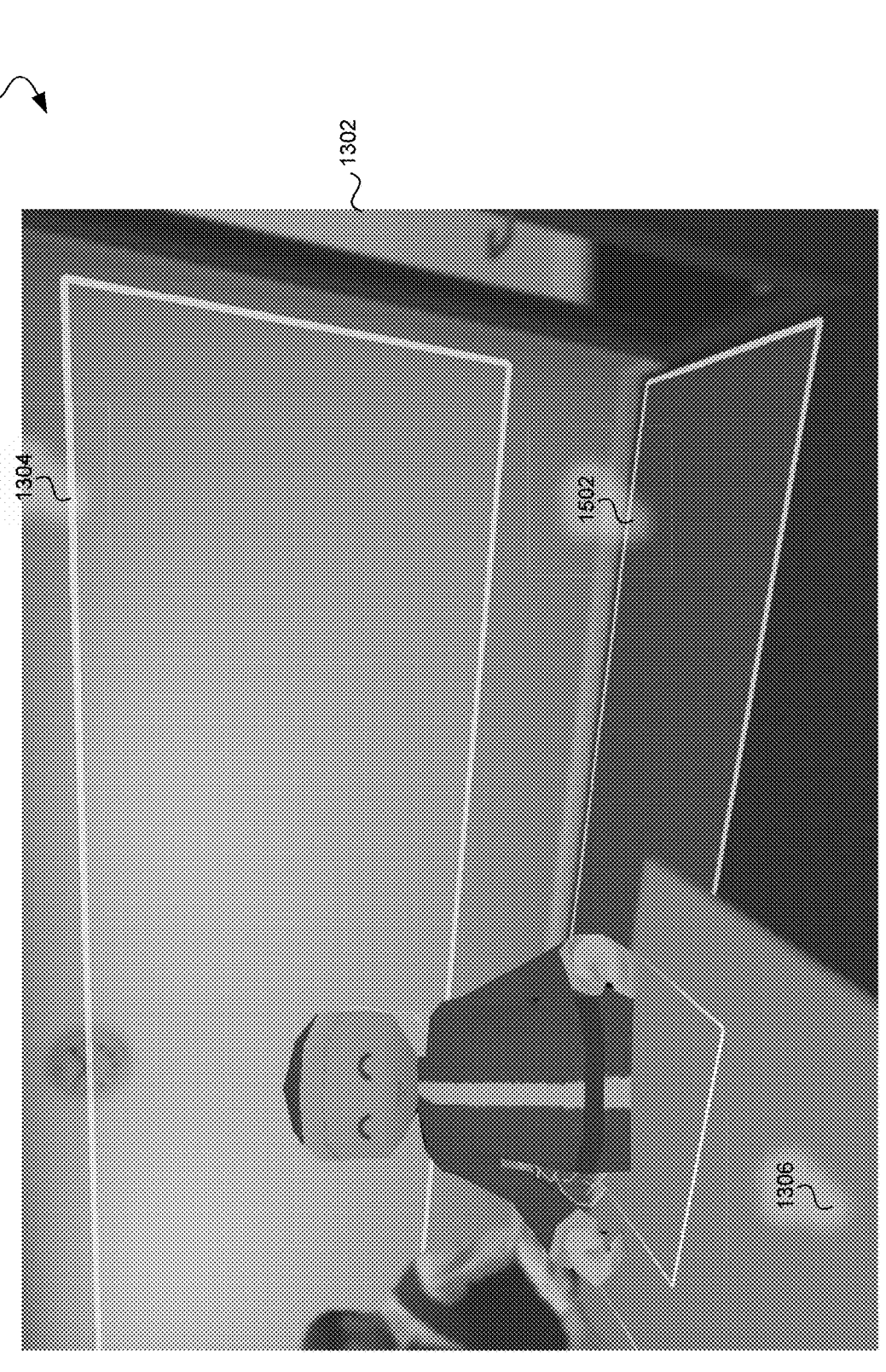
Figure 16:
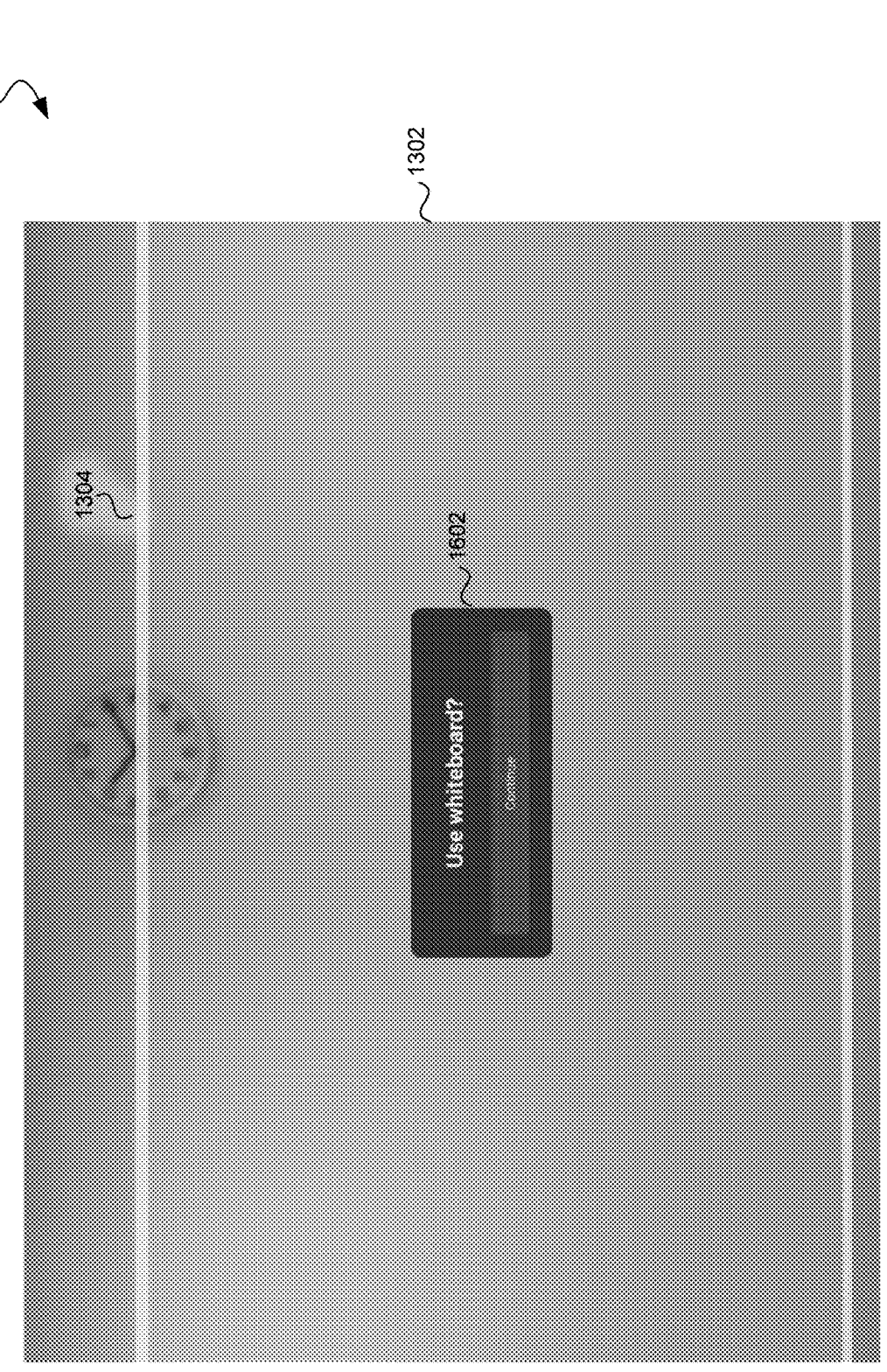
Figure 17:

FIG. 12 is a conceptual diagram that illustrates local users and remote users within a shared XR environment that includes an XR table and an XR board. For example, a mapping flow disclosed with reference to FIGS. 5-11 can be used to generate mapping definitions for the real-world room. The mapping definitions can include configuration definitions for several XR elements that define how to place the XR elements in the real-world room and semantic information for the XR elements. Diagram 1200 illustrates shared XR environment 1202, seat assignment 1204, remote user 1206, local user 1208, XR board 1210, and XR screen 1212.

Shared XR environment 1202 is the passthrough/local version. For example, shared XR environment 1202 can be displayed, using an XR system, to a local user. The perspective represented in shared XR environment 1202 can be the perspective of this local user. Local user 1208 is physically present in the real-world room and is represented in shared XR environment 1202 using the passthrough real-world visual (e.g., video capture) of the local user or a mixed reality visual of the local user. In another example, remote user 1206 is represented in shared XR environment 1202 as an avatar version, as the remote user is not physically present in the real-world room.

XR table 806, mapped and defined when mapping the real-world room, includes six seat placements. For example, two local users and one remote user are seated at XR table 806. Seat placement 1204 is vacant, and thus a new user that joins shared XR environment 1202 (e.g., local user or remote user) can select seat placement 1204. The real-world mapping definitions for the real-world room that implement shared XR environment 1202 also include configuration definitions for XR board 1210 and XR screen 1212.

For example, XR screen 1212 is located on (e.g., mapped to) a real-world wall in shared XR environment 1202. In some implementations, during the shared XR environment 1202, XR screen 1212 can display a video of one or more video users (e.g., users remote from the real-world room that are not rendered a remote/VR version of the shared XR environment). For example, the video user may view shared XR environment 1202, however may be present in a limited capacity (e.g., cannot sit an XR table 806, cannot interact with XR board 1210). XR screen 1212 can display any other suitable content, such as a video, web sites, a presentation, documents, etc.

XR board 1210 is located on (e.g., mapped to) a real-world wall in shared XR environment 1202. XR board 1210 can be an XR whiteboard that receives input (e.g., sensed hand-written input) from one or more local or remote users and renders the input to the users of shared XR environment 1202. In some implementations, multiple users can be located at XR board 1210 at once. XR board 1212 can display any other suitable content, such as a video, web sites, a presentation, documents, etc. In some implementations, one or both of local users 1208 and 1212 can physically approach the real-world wall that XR board 12010 is mapped to and trigger an interactions with XR board 1210.

FIGS. 13, 14, 15, 16, and 17 are conceptual diagrams that illustrate real-world movements and XR board interactions for a local user within a real-world room that is part of a shared XR environment. Diagrams 1300, 1400, 1500, 1600, and 1700 include shared XR environment 1302, XR board 1304, XR table 1306, interface panel 1402, XR board proximity area 1502, interface panel 1602, and XR board components 1702.

Diagrams 1300, 1400, 1500, 1600, and 1700 represent the perspective of a local user (e.g., passthrough version of a shared XR environment from the perspective of one of the local users). For example, an XR system displays, to the local user, the perspective represented by diagrams 1300,

1400, 1500, 1600, and 1700. Diagram 1300 illustrates shared XR environment 1302 which includes XR board 1304 and XR table 1306. In shared XR environment 1302, the local user is seated in a seat assignment at XR table 1306 and can view XR board 1304 from the seat assignment. XR board 1304 displays hand-written input.

In some implementations, the local user can interact with XR board 1304 by standing from the assigned seat (e.g., standing up) and physically approaching XR board 1304 (e.g., walked over to the board) to trigger an interaction. In diagram 1400, the XR system detects that the local user is in movement (e.g., when the local user stands or moves out of the predefined location for the local user's assigned seat) or the local user indicates movement using an interface component (e.g., pressing a button that initiates a movement flow). When a movement flow is initiated/detected, the XR system can display interface component 1402 to the local user, which signals to the local user that the user can freely move to another seat at XR table 1306 or to XR board 1304.

In the illustrated example, the local user moves towards XR board 1304. For example, in diagram 1500 the user has moved away from XR table 1306 and is approaching XR board 1304. In some implementations, once the local user is within a threshold distance from XR board 1304 (e.g., is located within board proximity area 1502) the XR system can trigger an interaction with XR board 1304. In diagram 1600, the user has reached XR board 1304 (e.g., is within board proximity area 1502) and the XR system displays interface panel 1602 to the user. For example, the user can initiate an input mode at XR board 1304 by continuing via interface panel 1602.

In diagram 1700, the user has initiated the input mode such that the XR system senses user movements and renders input that corresponds to the user movements at XR board 1304. For example, the user can draw, write alphanumeric characters, and otherwise render marks on XR board 1304 once the input mode is initiated. XR board components 1702 can be used to select configuration for the input at XR board 1304, for example the color of the rendered input, and other suitable configurations.

In some implementations, first XR systems render the shared XR environment as local versions (e.g., passthrough of captured visuals or mixed reality) to local users and second XR systems render the shared XR environment as remote versions (e.g., a virtual room) to remote users. For example, the local users can be physically present in the real-world room that hosts the shared XR environment while the remote users can be located elsewhere (e.g., at a home office, remote office, or any other suitable remoted location). In some implementations, both the locate users and the remote users present in a shared XR environment can interact with a displayed XR board.

Figure 18:
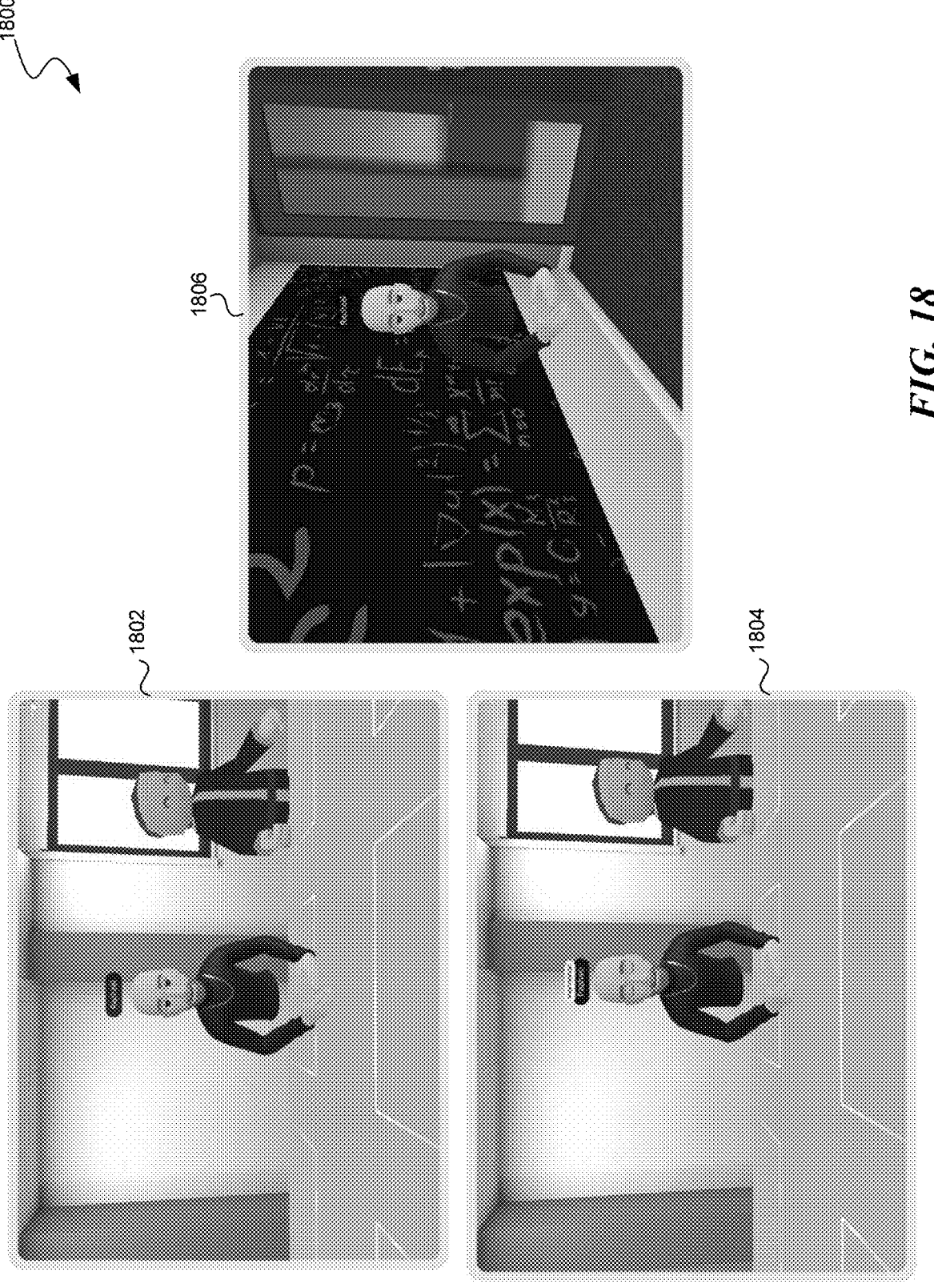
FIG. 18 is a conceptual diagram that illustrates avatar movement and XR board interactions for a remote user within a virtual reality room that is part of a shared XR environment.

FIG. 18 is a conceptual diagram that illustrates avatar movement and XR board interactions for a remote user within a virtual reality room that is part of a shared XR environment. Diagram 1800 illustrates movement examples 1802, 1804, and 1806 for a remote user. In some implementations, the remote user is remote from the real-world room that hosts the shared XR environment. The remote user is displayed a remote version of the XR environment (e.g., a virtual room that corresponds to the real-world room with one or more XR objects) by an XR system. The depicted XR environment includes an XR table with segmented seat assignments and an XR board located on one of the walls of the virtual room.

In diagram 1802, the remote user is seated in a seat assignment at the XR table. Because the user is remote and the user is displayed the remote version (e.g., virtual room version) of the shared XR environment, the user cannot freely move about the room. In order to move to the XR board, the user selects an interface component (not displayed) that initiates travel from the seat assignment at the XR table to the XR board. In diagram 1804, the XR system is performing/loading the remote user's travel to the XR board, as indicated by the remote user's closed eyes. In diagram 1806, the XR system has traveled the remote users to the XR board such that the remote user can initiate an input mode with the XR board.

Figure 19:
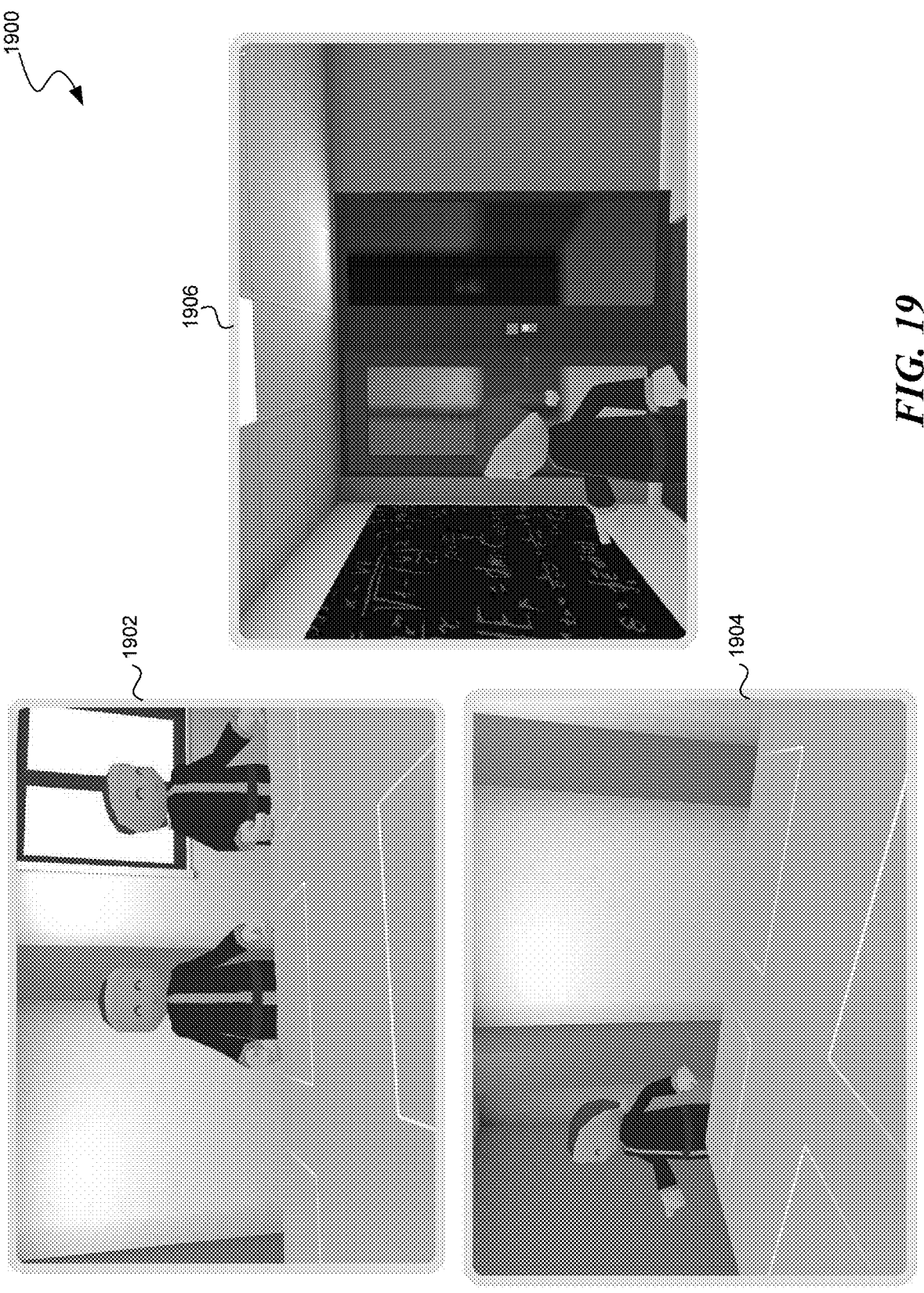
FIG. 19 is a conceptual diagram that illustrates real-world movement for a local user within a real-world room that is part of a shared XR environment.

FIG. 19 is a conceptual diagram that illustrates real-world movement for a local user within a real-world room that is part of a shared XR environment. Diagram 1900 illustrates movement examples 1902, 1904, and 1906 for a local user. In some implementations, the local user is located in the real-world room that hosts the shared XR environment. The local user is displayed a local version of the XR environment (e.g., a passthrough visual of the real-world room or mixed reality with augmented XR objects) by an XR system. The depicted XR environment includes an XR table with segmented seat assignments and an XR board located on one of the walls of the passthrough/mixed reality room.

In diagram 1902, the local user is seated in a seat assignment at the XR table. Because the user is local and is displayed the local version of the shared XR environment, the user can freely move about the room. In order to move to the XR board, the user can stand up and walk over to the XR board. In diagram 1904, the local user has stood up and is walking over to the XR board. In diagram 1906, the local user has reached the XR board can initiate an input mode with the XR board.

FIGS. 18 and 19 distinguish the movement flows for how a remote user and local user interact with an XR board during a shared XR environment. Local users can interact with an XR board mapped to the real-world room the local users and present in, however, remote users are not located in the real-world room and thus cannot interact with the XR board in the same way. In some implementations, the XR board can be mapped to a predefined location in a room/ space that the remote user occupies (or can access). For example, the remote user can have a mapped workspace that includes at least a mapping for the XR board, and in some implementations a mapping for a desk area.

Figure 20:
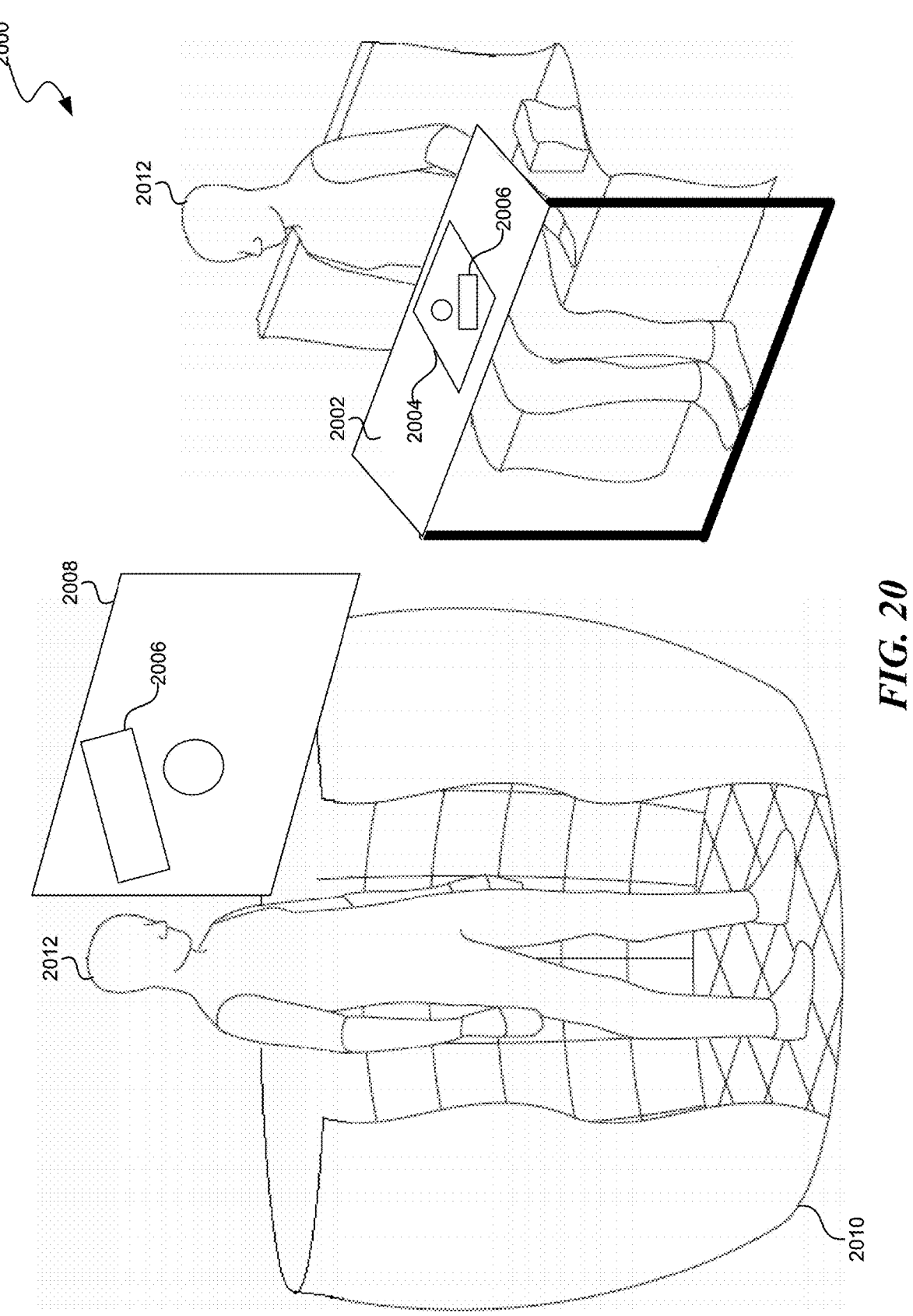
FIG. 20 is a conceptual diagram illustrating an example of creating an artificial reality working environment linked to multiple real-world spaces.

FIG. 20 is a conceptual diagram illustrating an example 2000 of creating an artificial reality working environment linked to one or more real-world spaces for a remote user. FIG. 20 includes a desk area 2002 and a whiteboard area 2010. The user 2012 can move between the real-world areas to move into the corresponding linked artificial reality working environment areas and to perform actions specified for those areas. Desk area 2002 includes a dedicated space 2004 showing content items such as content item 2006. Upon standing up and moving into the whiteboard area 2010, whiteboard 2008 is active. In some implementations, whiteboard 2008 can be part of a shared XR environment such that content items automatically populate from an XR board that is part of a shared XR environment.

For example, user 2012 can be a remote user that participates in a shared XR environment hosted at a real-world room. An XR system can display the remote version of the XR environment to user 2012, such as a virtual room with XR objects that correspond to an augmented version of the real-world room (e.g., captured visual of the real-world room augment with XR objects). In some implementations, the real-world room can have an XR board mapped to a physical location in the real-world room such that local users physically located in the real-world room can approach and interact with the XR board. Whiteboard 2008 can be linked to the XR board in the shared XR environment. For example, content drawn by one or more local users physically present in the real-world room can be displayed at whiteboard 2008. In addition, content drawn by user 2012 at whiteboard 2008 can be displayed to the local users in a local version of the shared XR environment.

In some implementations, the shared XR environment can include an XR table at which one or more remote users and local users are seated. When user 2012 transitions from the XR table to the XR board in the shard XR environment, user 2012 can physically move from desk area 2002 to whiteboard area 2010. In these examples, user 2012 (e.g., a remote user) can interact with the XR board in a shared XR environment using a mapping to a physical real-world space for an XR board at a remote room (e.g., at a room where user 2012 is located or can access), such as whiteboard area 2010. In some implementations, for each remote user that participates in a shared XR environment, a distinct mapping to a physical real-world space is used to implement the XR board in several different remote rooms (e.g., one room per remote user).

FIGS. 21-26 are diagrams that illustrate multiple versions of a shared XR environment in which users approach and interact with an XR board. Diagrams 2100, 2200, 2300, 2400, 2500, and 2600 illustrate local user perspective 2102, remote user perspective 2104, and camera view 2106. For example, users present in the shared XR environment can include local users 2112, 2114, and 2116 and remote user 2202. In some implementations, video user 2204 is a limited participant in the shared XR environment.

Local user perspective 2102 is the perspective of local user 2112 (e.g., local version of the shared XR environment displayed to user 2112 by an XR system). For example, local user perspective 2102 is a passthrough visual of the real-world room augmented with XR objects (e.g., XR board 2110). Remote user perspective 2104 is the perspective of remote user 2202 (e.g., remote version of the shared XR environment displayed to user 2202 by an XR system). For example, remote user perspective 2102 is a virtual room representation of the real-world room with displayed XR objects (e.g., XR board 2110, an XR table that corresponds to the real-world table). Camera view 2106 is a video captured by a camera (e.g., stationary camera) located in the real-world room that hosts the shared XR environment. For example, the camera can be part of an XR system, or any other suitable imaging device. Diagrams 2100, 2200, 2300, 2400, 2500, and 2600 illustrate local user perspective 2102, remote user perspective 2104, and camera view 2106 as a sequence that progresses forward in time.

Diagram 2100 illustrates camera view 2106, which shows local users 2112, 2114, and 2116 seated at chairs and a table physically present in the real-world room that hosts the shared XR environment. Local user perspective 2102 depicts XR augments in the visual of the real-world room displayed in the local version of the shared XR environment, such as XR board 2110 (which shows text already written) and XR panel 2108, which can be used by user 2112 to contribute during the shared XR environment (e.g., send messages to other users, etc.). Local user perspective 2102 in diagram 2100 contains a real-world visual depiction of user 2116 (e.g., passthrough visual and/or mixed reality visual).

Figure 21:
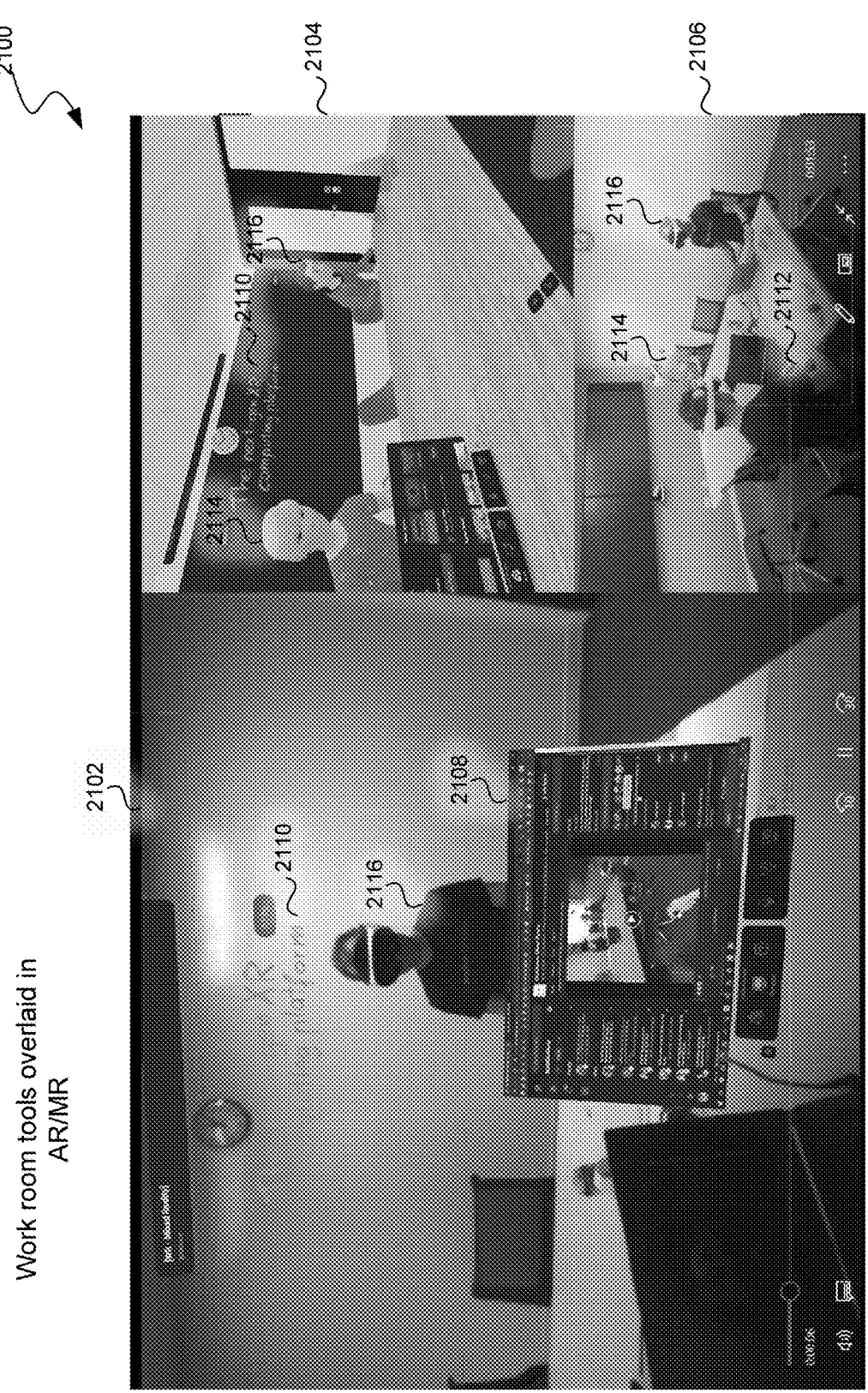
FIGS. 21-26 are diagrams that illustrate multiple versions of a shared XR environment in which users approach and interact with an XR board.
Figure 22:
Figure 23:
Figure 24:
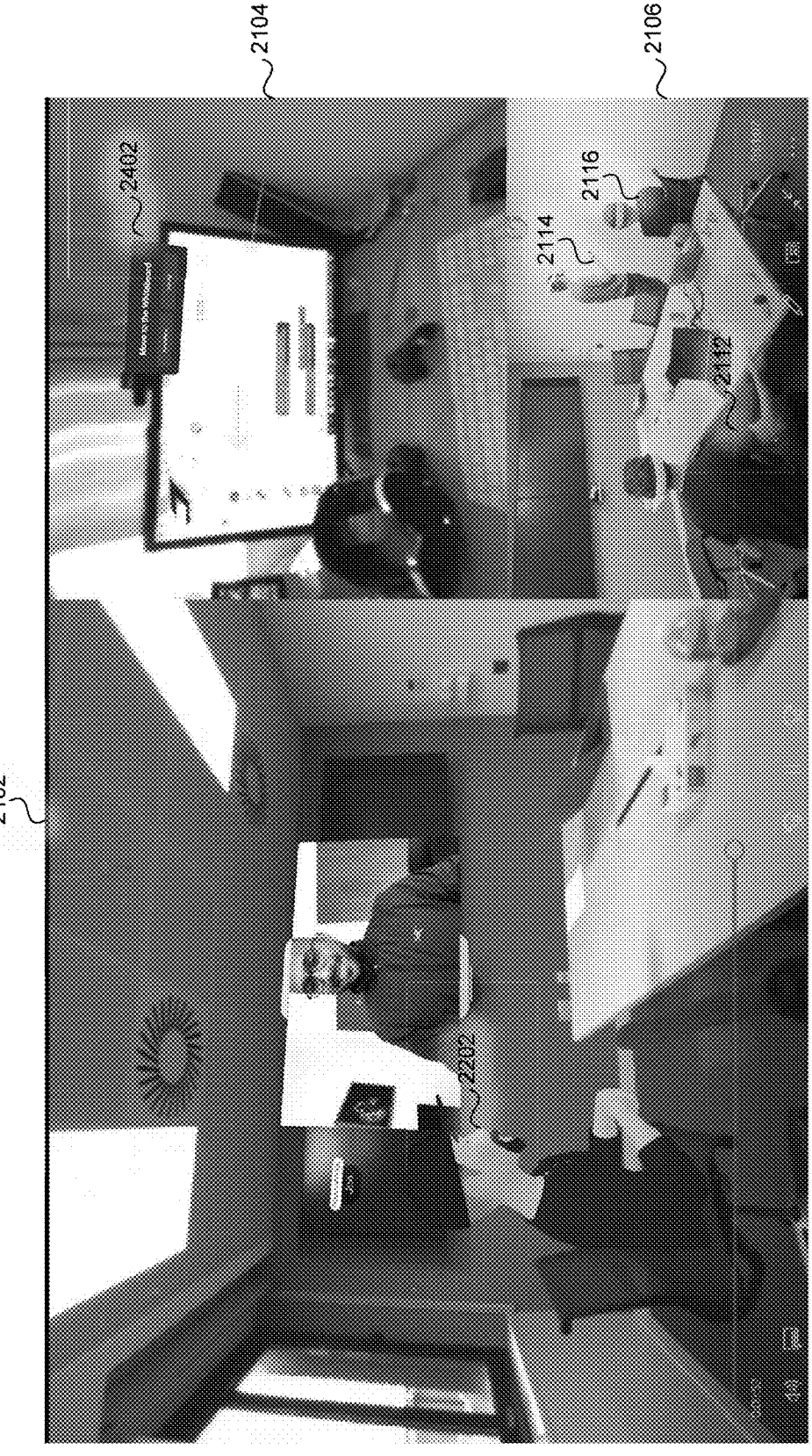
Figure 25:
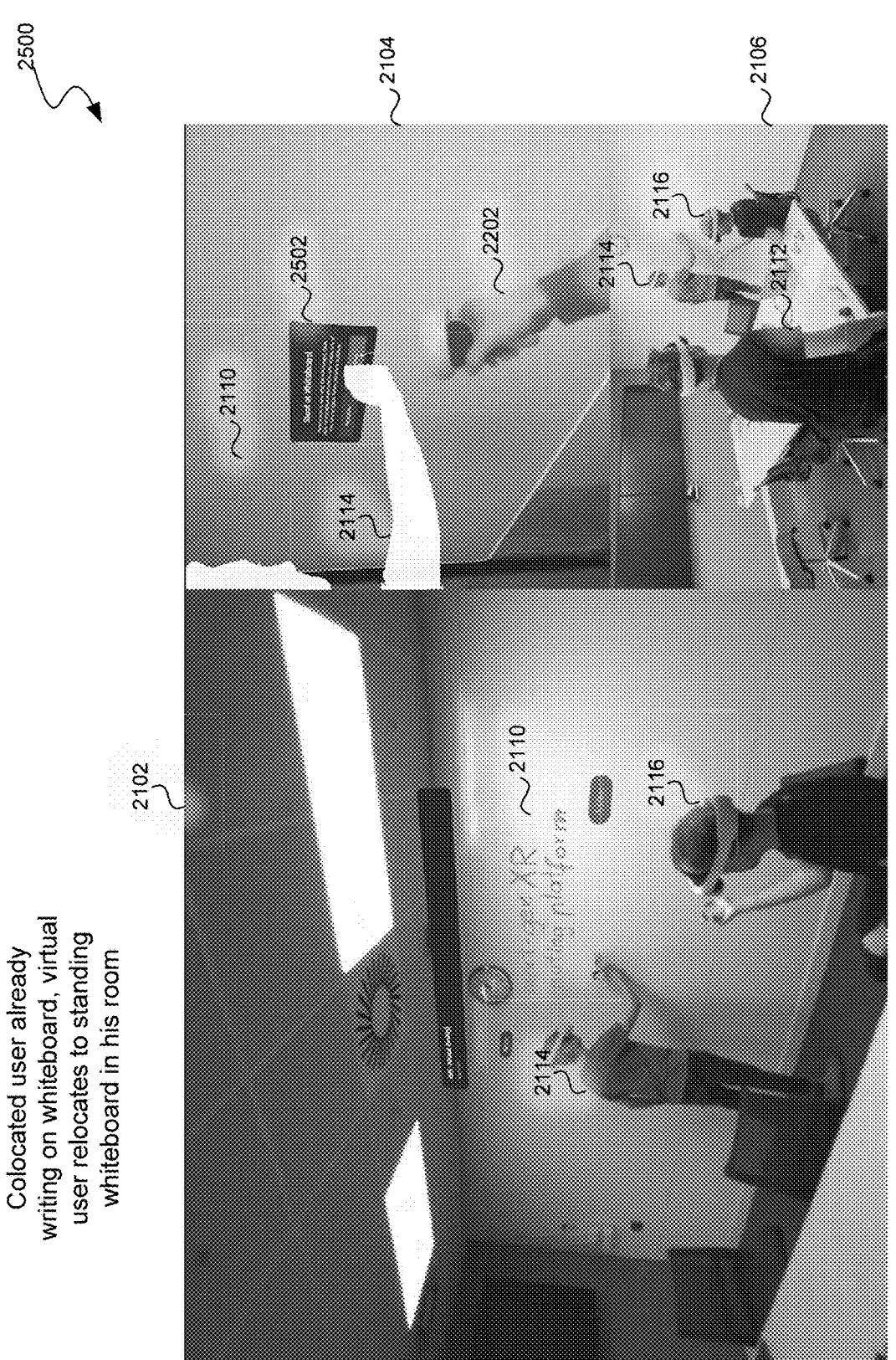
Figure 26:
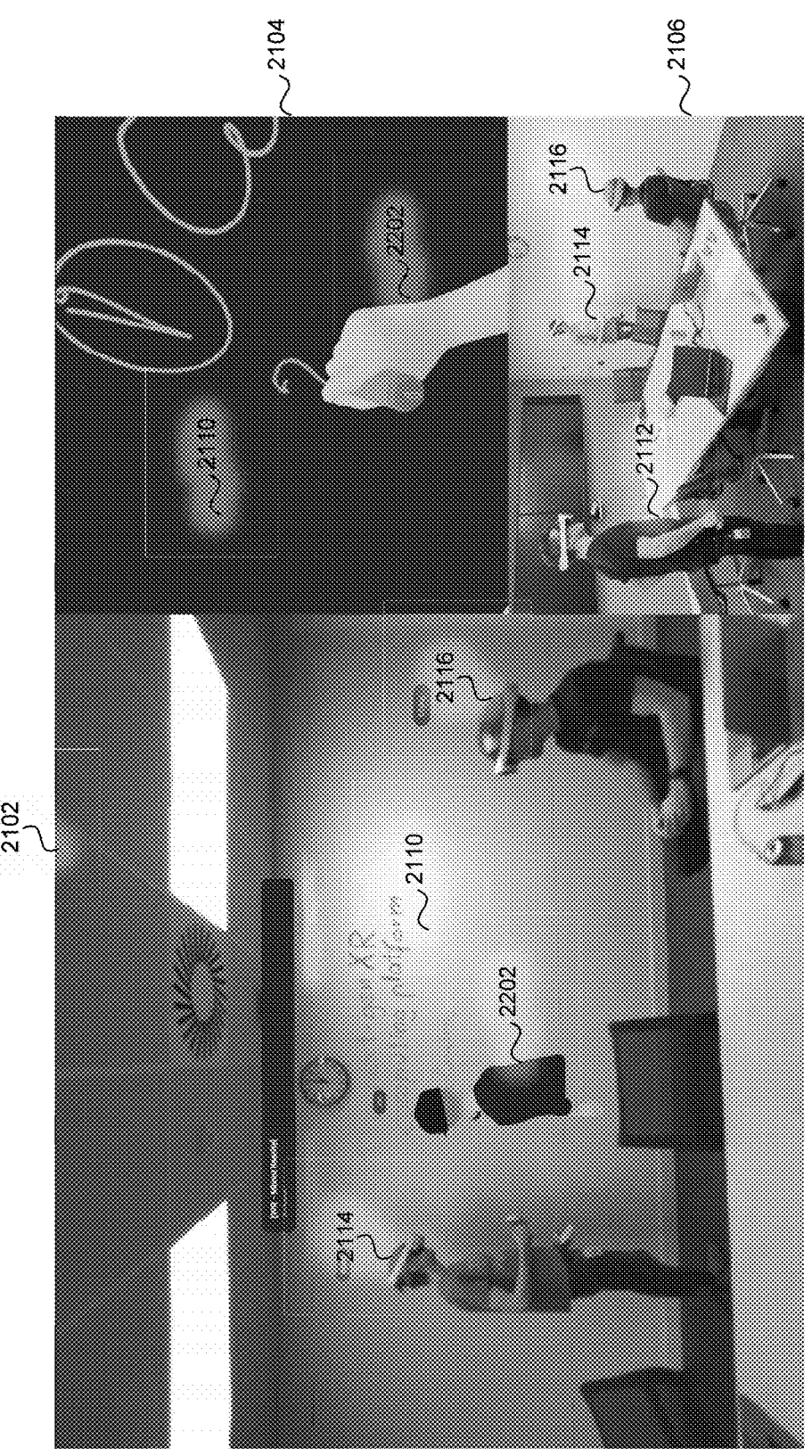

Diagram 2100 also illustrates remote user perspective 2104, or the perspective of remote user 2202 (shown in FIG. 22 but not show in FIG. 21). The remote version of the shared XR environment displays avatars for local users 2112, 2114, and 2116 located at an XR table in the seats that correspond to their physical seats in the real-world room.

Diagram 2200 illustrates camera view 2106 with local users 2112 and 2114 still seated at chairs at the physical table, however local user 2112 has gotten up and relocated to a standing position. Diagram 2200 also illustrates local user perspective 2102 after local user 2112 has gotten up and relocated, which includes an avatar for remote user 2202 (seated at the XR table to the left of local user 2112's seat, which is unoccupied) and video user 2204, shown on XR screen 2204. The differences between camera view 2106 and local user perspective 2102 in diagram 2200 demonstrates the augments added to the passthrough visual/mixed reality visual of the local version of the shared XR environment, such as an avatar for remote user 2202, XR screen 2204, XR panel 2108, and XR board 2110. Diagram 2200 also illustrates remote user perspective 2104, which continues to show avatars for local users 2114 and 2116 at the XR table in the seats that correspond to their physical seats in the real-world room (the avatar for local user 2112 is not visible based on remote user 2202's head positioning/gaze).

Diagram 2300 illustrates camera view 2106 with local users 2112 and 2116 seated at chairs at the physical table, however local user 2114 has gotten up and is relocating (moving to XR board 2110 shown in local user perspective 2102). Diagram 2300 also illustrates local user perspective 2102 (after local user 2112 has taken a seat back at the physical table) which includes the avatar for remote user 2202. Diagram 2300 also illustrates remote user perspective 2104, which continues to show an avatar for local user 2116 at the XR table in the seat that corresponds to the local user's physical seat in the real-world room, however the avatar for local user 2114 has closed eyes, indicating that local user 2114 is relocating in the real-world room.

Diagram 2400 illustrates camera view 2106 with local users 2112 and 2116 seated at chairs at the physical table, and local user 2114 at the wall that is mapped to XR board 2110. Diagram 2400 also illustrates local user perspective 2102 which continues to show the avatar for remote user 2202, however the avatar has closed eyes indicating that remote user 2202 is relocating. Diagram 2400 also illustrates remote user perspective 2104, which has transitioned from a view of the remote version of the shared XR environment to a passthrough visual of the user's real-world surroundings. For example, user 2202 is physically repositioning to a real-world space mapped to XR board 2110 that is located in a real-world room occupied by (or accessible by) user 2202. User 2202's xR system detected the reposition (e.g., by detecting that user 2202 moved away from a predefined desk space) and displayed interface element 2402, which user 2202 can use to confirm the reposition.

Diagram 2500 illustrates camera view 2106 with local user 2116 seated at a chair at the physical table, local user 2114 at the wall that is mapped to XR board 2110, and local user 2112 standing. Diagram 2500 also illustrates local user perspective 2102, which shows local user 2114 interacting with (e.g., writing on) XR board 2110. Diagram 2500 also illustrates remote user perspective 2104, which continues to show the passthrough visual of the user's real-world surroundings. User 2202 has moved to the real-world space mapped to XR board 2110 located in the real-world room occupied by user 2202. User 2202's xR system detects that user 2202 is proximate to the real-world space mapped to XR board 2110, and the XR system displays interface element 2502, which user 2202 can user to trigger interaction with XR board 2110. Remote user perspective 2104 in Diagram 2500 also illustrates an outline of the avatar for user 2114 interacting with the XR board 2110.

Diagram 2600 illustrates camera view 2106 with local user 2116 seated at a chair at the physical table, local user 2114 at the wall that is mapped to XR board 2110, and local user 2112 standing. Diagram 2600 also illustrates local user perspective 2102, which shows local user 2114 located at XR board 2110 and an avatar for remote user 2202 interacting with XR board 2110. Diagram 2600 also illustrates remote user perspective 2104, which has transitioned from the pass-through visual of the surround for user 2202 back to the remote version of the shared XR environment. In particular, remote user perspective 2104 in diagram 2600 shows remote user 2202 interacting with XR board 2110. In the illustrated example, different real-world spaces are mapped to a shared XR board such that representations (different representations, such as an avatar and a pass-through visual/mixed reality visual) of users located in different physical space can both interact with the XR board.

Figure 27A:
FIG. 27A is a conceptual diagram that illustrates a display error for text that augments a passthrough version of a shared XR environment.
Figure 27A:
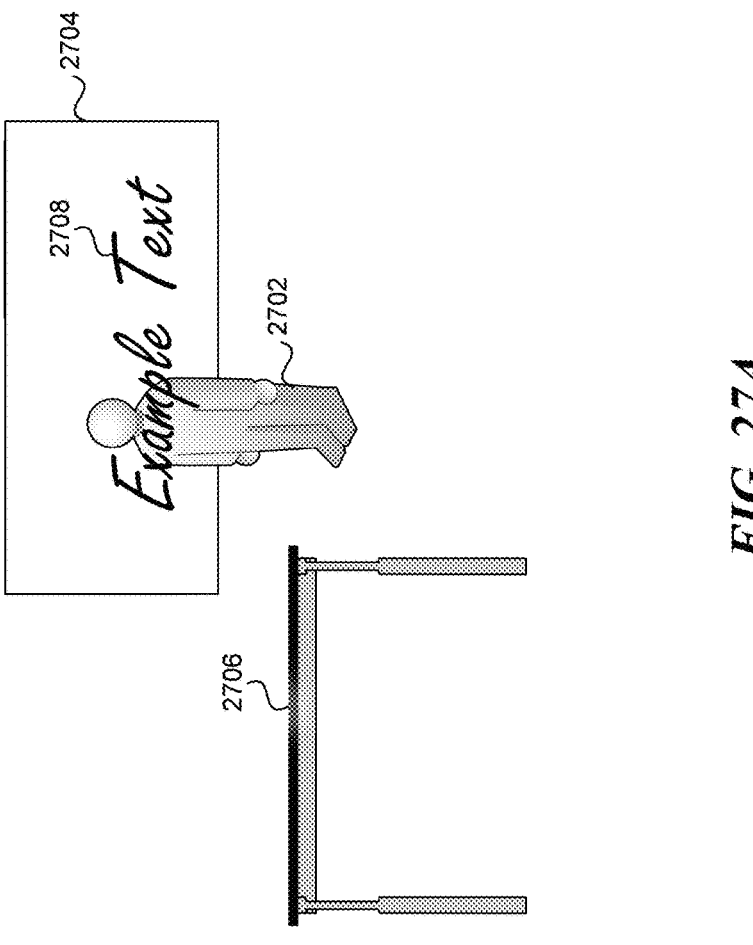

FIG. 27A is a conceptual diagram that illustrates a display error for text that augments a pass-through version of a shared XR environment. Diagram 2700A illustrates a shared XR environment that is rendered to at least two users using first and second XR systems. For example, the shared XR environment can include two local users, a first user not depicted in diagram 2700A and user 2702. Diagram 2700A can be the local version of the shared XR environment displayed to the first user (e.g., the shared XR environment from the perspective of the first user) via the first XR system. User 2702 can also be a local user displayed a local version of the shared XR environment via the second XR system. The shared XR environment can be hosted in a real-world room (e.g., with stored mappings for the XR environment) and the local users can be physically present in the host real-world room.

Diagram 2700A illustrates that the local version of the shared XR environment includes XR object augmentations, such as XR board 2704, XR table 2706, and augmented text 2708. For example, the local version of the shared XR environment displayed from the first user's perspective can be passthrough video capture or mixed reality visuals displayed to the user via the first XR system. XR board 2704 can be passthrough video capture of a real-world surface mapped to XR board 2704 augmented by one or more augmentations displayed by XR board 2704, such as augmented text 2708. A display error that can occur in such a setting is displaying augmented text 2708 on top of user 2702 even though the augmented text is behind user 2702 from the perspective of the first user. For example, because XR board 2704 and augmented text 2708 are virtual elements (e.g., virtual objects) of the shared XR environment and user 2702 is a passthrough element of the shared XR environment, the first XR system can encounter problems with depth estimation. Implementations can generate an occlusion mask using avatar data to mitigate this error.

Figure 27B:
FIG. 27B is a conceptual diagram that illustrates an occlusion mask that mitigates a display error in a passthrough version of a shared XR environment.
Figure 27B:
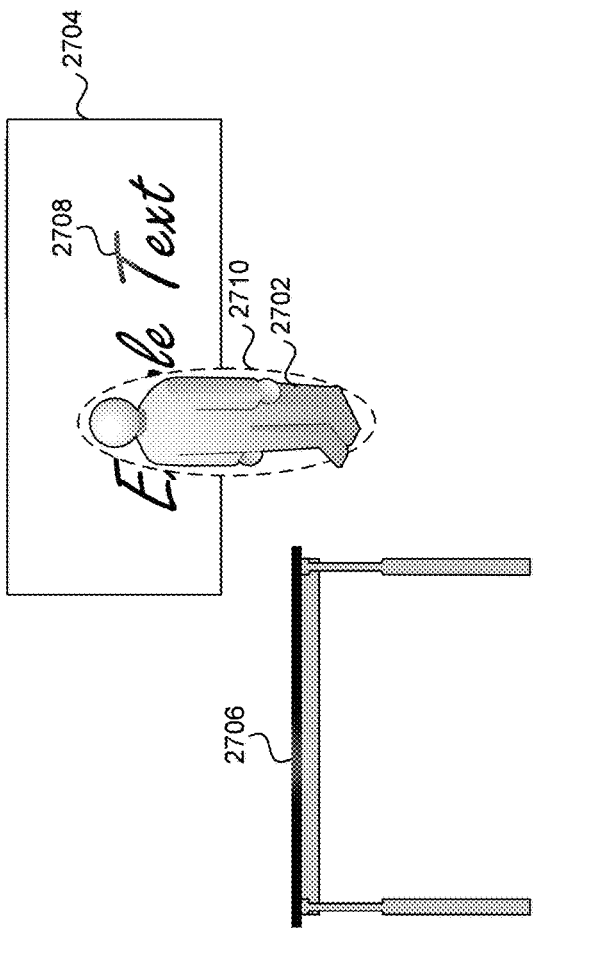

FIG. 27B is a conceptual diagram that illustrates an occlusion mask that mitigates a display error in a pass-through version of a shared XR environment. Diagram 2700B includes user 2702, XR board 2704, XR table 2706, augmented text 2708, and occlusion mask 2710. For example, occlusion mask 2710 can be attached to a determined location of an avatar for user 2702 (though the avatar is not displayed in the shared XR environment) to support effective occlusion of virtual objects relative to user 2702. In some implementations, location tracking and pose data (within the shared XR environment) for the avatar for user 2702 can be tracked by the second XR system (of user 2702)

and transmitted to the first XR system (of the first user). The first XR system can then generate occlusion mask 2710 (e.g., according to the geometry for the avatar) and affix the mask to the non-displayed avatar location for user 2702 according to the tracking and pose data. In some implementations, occlusion mask 2710 can be attached relative, in the XR environment, to the location and pose data for the avatar of user 2702. For example, as depicted in diagram 2700B, occlusion mask 2710 can cause portions of XR board 2704 and augmented text 2708 to not be displayed in the shared XR environment.

In some cases, the occlusion mask can be always attached to the avatar location. In other cases, the first XR system can affix occlusion mask 2710 to the non-displayed avatar for user 2702 when a render overlap is detected for user 2702 and XR board 2704. For example, the first XR system receives the tracking information and pose data of the non-displayed avatar for user 2702 and the first XR system stores the location, within the local version of the shared XR environment, for XR board 2704. When it is determined that user 2702 will overlap with XR board 2704 (from the first user perspective) based on the tracking information and pose data of the non-displayed avatar for user 2702, the first XR system can affix occlusion mask 2710 to the non-displayed avatar of user 2702.

While the avatar for user 2702 is not displayed in the shared XR environment, the data available by tracking the location of pose data for the avatar permits implementation of occlusion mask 2710. In some implementations, occlusion mask 2710 is a structured shape (e.g., oval, square, other suitable polygon, etc.) or is shaped according to the geometry of the avatar for user 2702. In some implementations, occlusion mask 2710 is larger than the avatar for user 2702, for example to support an occlusion footprint larger than the avatar so that virtual objects/augments are not mistakenly rendered over user 2702.

In some implementations, the first XR system can determine a speed for user 2702 according to the tracking location and pose data received from the second XR system. The size of occlusion mask 2710 can be adjusted based on the determined movement speed. For example, when the determined movement speed exceeds a speed threshold (e.g., 6 ft/s, 8 ft/s, 10 ft/s, 12 ft/s, etc.), the occlusion mask can be enlarged (e.g., 105%, 110%, 115%, 120%, etc.). In another example, when the determined movement speed is above a threshold, the size of the occlusion mask is set relative to the determined movement speed, until the occlusion mask reaches a maximum size. Because the tracking location and pose data of the avatar for user 2702 does not correspond exactly to the actual presence of user 2702 in the shared XR environment (e.g., the passthrough video capture of user 2702 is displayed rather than the avatar) an enlarged occlusion mask 2710 when user 2702 reaches a threshold speed can further mitigate the risk that virtual objects/augments are mistakenly rendered over user 2702.

In some implantations, an opacity/transparency for occlusion mask 2710 can be non-uniform, where the transparency for the occlusion mask is increased near its edge. For example, when the occlusion mask is enlarged, such as based on a determined movement speed for user 2702, the edges of the enlarged occlusion mask can have an increased transparency to mitigate the obtrusiveness of the enlarged occlusion mask. In some implementations, occlusion masks can also be generated for virtual objects displayed in a shared XR environment.

Figure 28A:
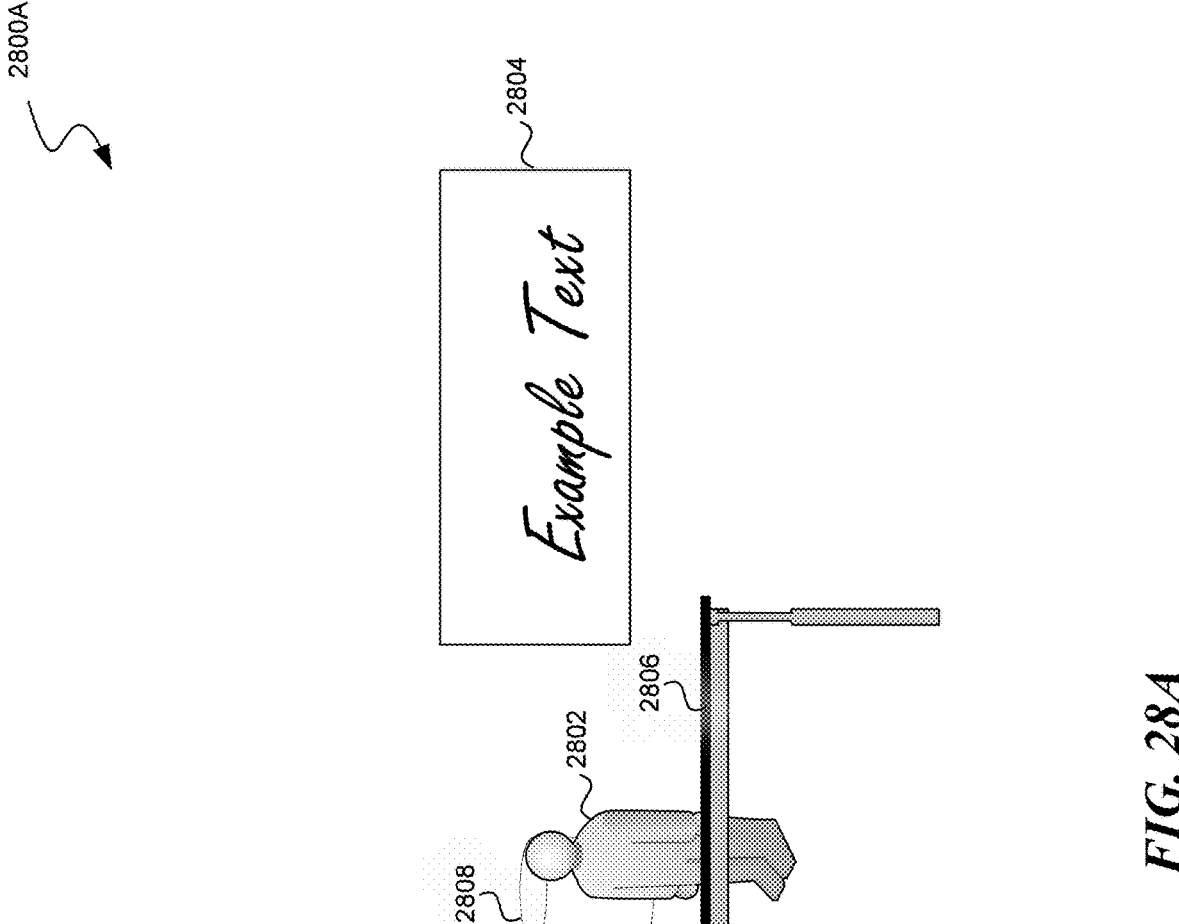
FIG. 28A is a conceptual diagram that illustrates a display error for virtual object in a passthrough version of a shared XR environment.

FIG. 28A is a conceptual diagram that illustrates a display error for a virtual object in a passthrough version of a shared XR environment. Diagram 2800A illustrates a shared XR environment that is rendered to at least two users using first and second XR systems. For example, the shared XR environment can include remote user 2802 and a local user (user not depicted in diagram 2800A). Diagram 2800A can be the local version of the shared XR environment displayed to the local user (e.g., the shared XR environment from the perspective of the local user) via the first XR system. Remote user 2802 can be displayed a remote version of the shared XR environment via the second XR system. The shared XR environment can be hosted in a real-world room (e.g., with stored mappings for the XR environment), user 2802 can be remote from the real-world room, and the local user can be physically located in the real-world room.

Diagram 2800A illustrates that the local version of the shared XR environment includes XR object augmentations, such as XR board 2804, XR table 2806, and virtual object 2808. For example, the local version of the shared XR environment displayed from the local user's perspective can be passthrough video capture or mixed reality visuals displayed to the local user via the first XR system. In some implantations, user 2802 can be an avatar representation, such as an avatar seated at an assigned seat of XR table 2806. In the illustrated example, virtual object 2808 is located above XR table 2806, both of which are in front of user 2802 from the perspective of the local user. However, rending errors can occur that cause user 2802 (e.g., an avatar representation) to obstruct portions of virtual object 2808. Implementations can generate an occlusion mask for the virtual object to mitigate this error.

Figure 28B:
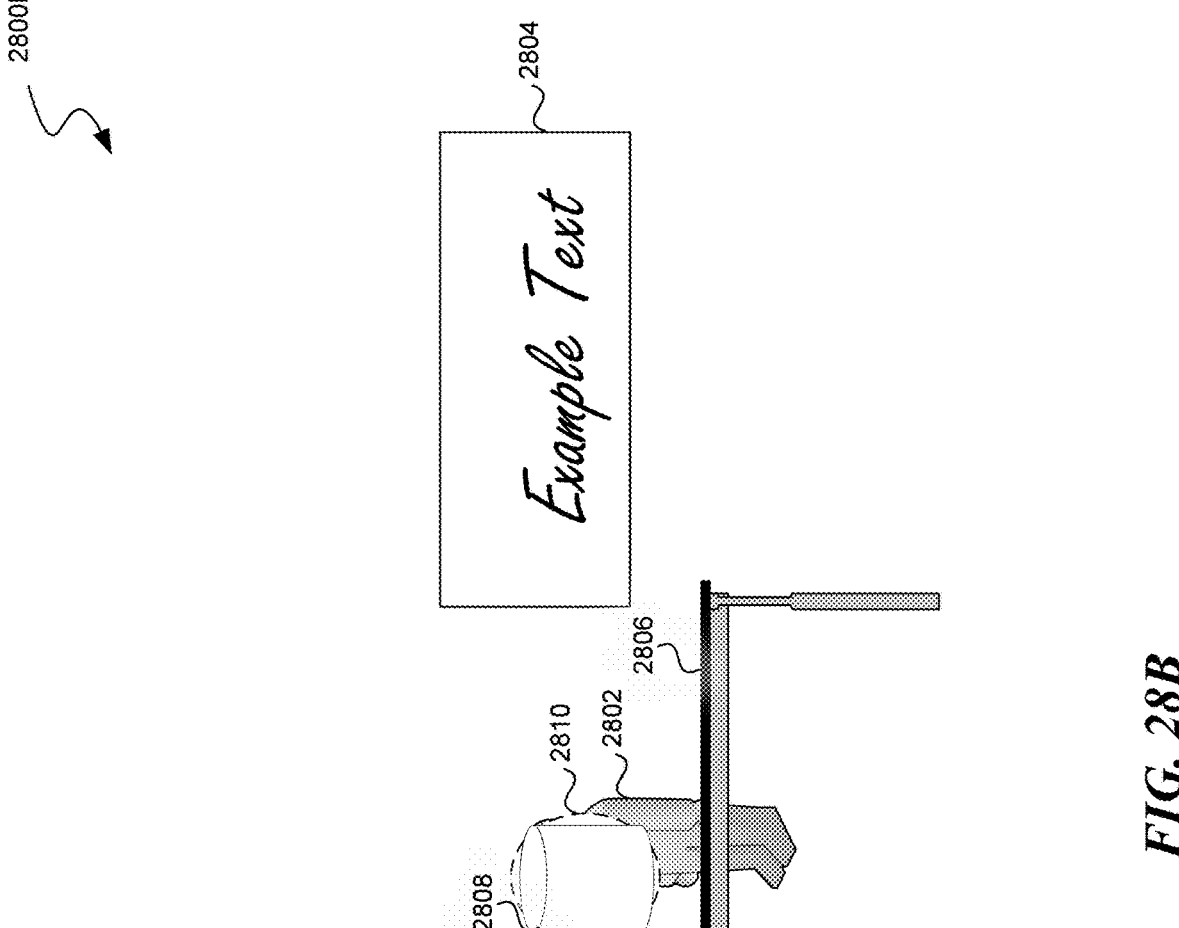
FIG. 28B is a conceptual diagram that illustrates an occlusion mask that mitigates a display error in a passthrough version of a shared XR environment.

FIG. 28B is a conceptual diagram that illustrates an occlusion mask that mitigates a display error in a passthrough version of a shared XR environment. Diagram 2800B includes user 2802, XR board 2804, XR table 2806, virtual object 2808, and occlusion mask 2810. For example, occlusion mask 2810 can be attached to virtual object 2808 to support effective occlusion relative to the virtual object. In some implementations, the virtual object location and geometry can be tracked by the first XR system. The first XR system can then generate occlusion mask 2810 (e.g., according to the tracked location) and affix the mask to virtual object 2808. As depicted in diagram 2800B, occlusion mask 2810 can cause portions of the avatar for user 2802 to not be displayed in the shared XR environment.

In some implementations, the first XR system can affix occlusion mask 2810 to virtual object 2808 when a render overlap is detected for the avatar of user 2802 and virtual object 2808. For example, the first XR system receives the tracking information and pose data of the avatar for user 2802 and the first XR system tracks the location for virtual object 2808 within the local version of the shared XR environment. When it is determined that virtual object 2808 will overlap with the avatar for user 2802 (from the first user perspective), the first XR system can affix occlusion mask 2810 to virtual object 2808.

In some implementations, occlusion mask 2810 is a structured shape (e.g., oval, square, other suitable polygon, etc.) or is shaped according to the geometry of virtual object 2808. In some implementations, occlusion mask 2810 is larger than virtual object 2808, for example to support an occlusion footprint larger than the virtual object so avatars/augments/virtual objects are not mistakenly rendered over virtual object 2808. In some implantations, an opacity/transparency for occlusion mask 2810 can be non-uniform, where the transparency for the occlusion mask is increased near its edge.

Those skilled in the art will appreciate that the components illustrated in FIGS. 1-26, 27A, 27B, 28A, and 28B described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 29:
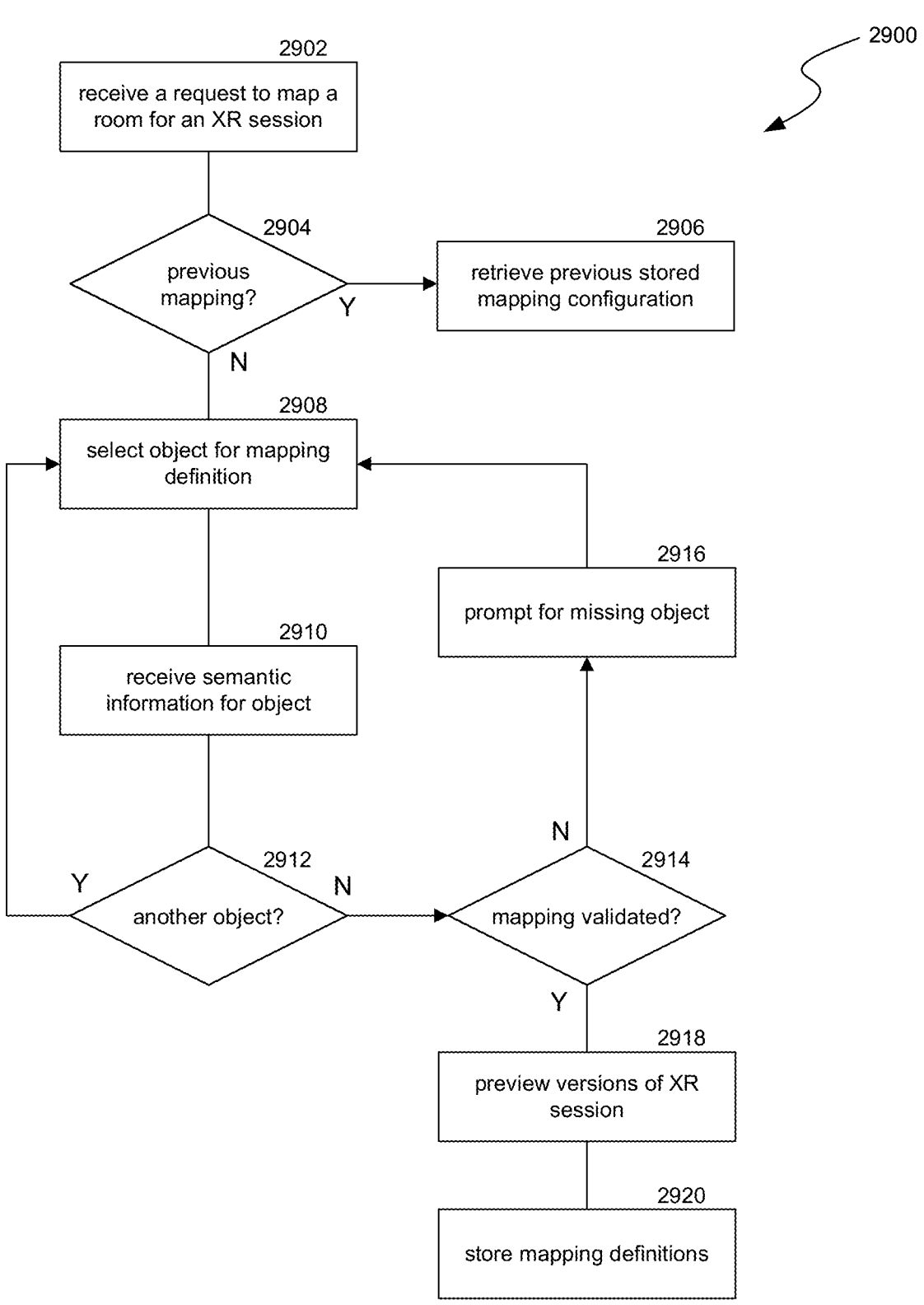
FIG. 29 is a flow diagram illustrating a process used in some implementations of the present technology for mapping a real-world room to implement a shared XR room.

FIG. 29 is a flow diagram illustrating a process used in some implementations of the present technology for mapping a real-world room to implement a shared artificial reality (XR) room. In some implementations, process 2900 can begin when a user puts on an XR device and/or when the user activates an artificial reality working environment application on their XR device. In other implementations, process 2900 can begin when a user activates a set-up or calibration process within an artificial reality working environment application.

At block 2902, process 2900 receive a request to implement a shared XR room using a real-world room. For example, a mapping for the real-world room that configures a shared XR room can be generated. In some implementations, the mapping can include one or more object definitions, semantic information for the XR objects, boundaries for the XR objects, etc.

At block 2904, process 2900 can determine whether the room has a previously stored mapping. For example, mapping definitions can be stored for real-world rooms that have been previously mapped. The mapping definitions can be associated with a geographic location of the real-world room (e.g., address and location in building, room number and building identifier, etc.). In some implementations, the geographic location for the real-world room can be used to search previously stored mappings to determine if one exists.

When the room has a previously stored mapping, process 2900 can progress to block 2906. When the room does not have a previously stored mapping, process 2900 can progress to block 2908. At block 2906, process 2900 can retrieve the previously stored mapping. For example, when a previously stored mapping for the room exists, the user can: a) use the previously stored mapping to support a shared XR room environment; and/or b) edit the previously stored mapping to change semantic information of previously stored object definitions, predefined borders on surfaces for previously stored object definitions, add new object definitions (e.g., using a flow similar to blocks 2908-2914), etc.

At block 2908, process 2900 can select an object for mapping. For example, objects that can be selected for mapping include table(s), board(s), chair(s), door(s), window(s), screen(s), and other suitable objects. The user can select one of the available objects for mapping and follow a flow to map the selected object via blocks 2910 and 2912, such as a flow for an XR table described with reference to FIGS. 7-11.

At block 2910, process 2900 can receive semantic information for the selected object. For example, semantic information can include: labels that identify the XR object (e.g., XR table, XR board, XR chair, XR window, XR door, etc.), a number of chairs/placements for an XR table, etc. In some implementations, a user with an XR system located within the real-world room can provide the semantic information.

In some implementations, semantic information for at least an XR table and XR board is received. For example, first mappings and second mappings that correspond to the XR table and XR board can be received. The first mappings can be boundaries on a horizontal surface that represent real-world positioning for the XR table (e.g., real-world mapping/anchor) and the second mappings can be boundaries on a vertical surface that represent real-world positioning for the XR board (e.g., real-world mapping/anchor). In some implementations, at least a portion of the boundaries are identified by the user using the XR system (e.g., hand-held controller, HMD, etc.).

In some implementations, semantic information for XR objects can be automatically generated. For example, seat segments for users at the XR table can be automatically generated based on a number of seats. The seat assignments can be defined areas within the boundaries on the flat horizontal surface (from the semantic information for the XR table). In some implementations, the generated seat assignments (e.g., segmentations) can augment the semantic information for the XR table.

At block 2912, process 2900 can determine whether another object is selected for mapping. For example, the user can select additional objects (e.g., chair(s), door(s), screen(s), window(s), additional table(s), additional board(s), etc.) to map. When another object is not selected for mapping, process 2900 can progress to block 2914. When another object is selected for mapping, process 2900 can loop back to block 2908. For example, blocks 2908 and 2910 can be repeated for objects selected for mapping until another object is not selected for at block 2912.

At block 2914, process 2900 can determine whether the generated mapping definitions for the shared XR room meet a validation criteria. For example, a mapping definition can be generated for each XR object mapped for the shared XR room/real-world room. The mapping definitions can store the semantic information received for the XR objects.

In some implementations, the mapping definitions can be compared to a validation criteria to determine whether the mapping definitions are sufficient to implement a shared XR room environment. Example validation criteria include: a) one XR table, one XR board; b) one XR table, one XR board, one XR screen; c) one XR table, one XR board, one XR door; one XR window; d) one XR table, one XR board, at least two XR chairs; e) any combination thereof or any other suitable criteria. In some implementations, example validation criteria include criteria specific to certain XR objects. Example validation criteria specific to certain XR objects can include: an XR table with at least a minimum number of seat assignments, an XR table of a minimum size, an XR board of a minimum size, any combination thereof, or any other suitable criteria.

When the generated mapping definitions meet the validation criteria, process 2900 can progress to block 2918. When the generated mapping definitions do not meet the validation criteria, process 2900 progress to block 2916. At block 2916, process 2900 can display a prompt for one or more missing XR objects and/or for edits to one or more defined XR objects. For example, the validation criteria failed by the generated mapping definitions can be displayed to the user (e.g., XR board does not meet minimum size, missing XR door and XR window, XR table does not include minimum number of seat assignments, etc.). From block 2916, process 2900 can loop back to block 2908 such that missing XR object(s) can be mapped and/or existing XR object(s) can be edited. Blocks 2908, 2910, and 2914 can be repeated until the generated mapping definitions meet the validity criteria at block 2914.

At block 2918, process 2900 can preview a local version of the shared XR room hosted by the real-world room according to the generated mapping definitions and a remote version of the shared XR room hosted by the real-world room according to the generated mapping definitions. For example, the preview of the local version can be a pass-through display of the real-world room augmented with at least the XR table at a location that corresponds to the XR table object definitions and the XR board at a location that corresponds to the XR board object definitions. In some implementations, the preview of the local version can be displayed to a user that is physically located in the real-world room such that the passthrough visuals of the real-world room can be augmented with XR objects.

In some implementations, the preview of the remote version can be a virtual reality room that includes the XR table and the XR board. For example, the virtual reality room can include a geometry that corresponds to a geometry of the real-world room and relative locations for the XR table and the XR board within the virtual reality room that correspond to locations as defined in the object definitions for the XR table and the XR board.

At block 2920, process 2900 can store the mapping definitions generated. For example, the stored mapping definitions are used to implement the shared XR room for one or more local users using a passthrough display of the real-world room that includes at least the XR table and XR board and one or more remote users using a virtual reality version of the real-world room that includes at least the XR table and XR board.

In some implementations, remote users can also map one or more XR objects to a physical space accessible by the remote user. For example, a desk space and a whiteboarding space can be mapped for a remote user. In some implementations, the mapped whiteboarding space can support remote user interactions with an XR board that is part of a shared XR room environment. In this example, the remote user can interact with an XR board in a physical space that is remote from the real-world room that hosts the shared XR room environment.

Figure 30:
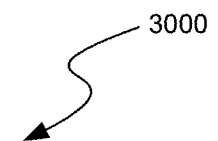
FIG. 30 is a flow diagram illustrating a process used in some implementations of the present technology for creating an artificial reality working environment with one or both of a desk space and/or a standing space.
Figure 30:
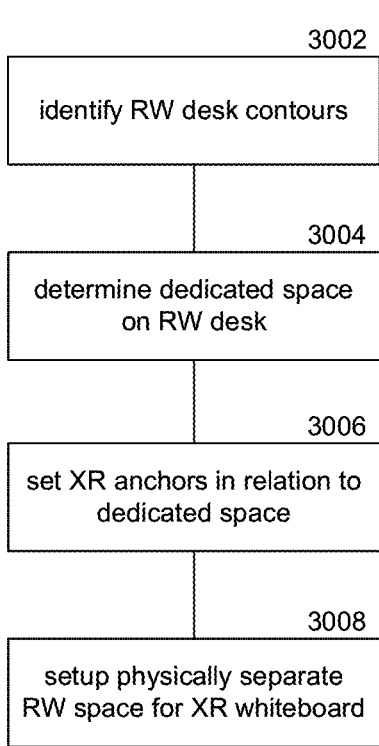

FIG. 30 is a flow diagram illustrating a process used in some implementations of the present technology for creating an artificial reality working environment with one or both of a desk space and/or a standing space for a remote user. An example illustrating a desk space and a whiteboarding space is provided above in relation to FIG. 20. In some implementations, process 3000 can begin when a user puts on an XR device and/or when the user activates an artificial reality working environment application on their XR device. In other implementations, process 3000 can begin when a user activates a set-up or calibration process within an artificial reality working environment application.

At block 3002, process 3000 can establish a desk space by identifying contours of a real-world desk to which the desk space will be linked. In some implementations, a height desk contour can be manually specified by a user e.g., by placing a hand (which the XR device is tracking) or a tracked controlled on the desk surface to specify a height of the top of the desk. The user can also trace an area or mark area corners on the real-world desk with a hand, controller, or a ray cast from a hand/or controller (e.g., while the XR device is in passthrough mode so the user can see the real-world desk). In some implementations, process 3000 can automatically identify some or all of the desk contours, such as by employing computer vision (e.g., using regular and/or depth cameras) to identify a flat surface and its height; and/or by using a height determined for tracked objects placed on the real-world desk (e.g., a tracked keyboard, mouse, controller, etc.)

At block 3004, process 3000 can determine a dedicated space on the real-world desk. As with the desk contours, the dedicated space can be manually set by a user (e.g., by defining a rectangle on the top of the desk with the user's hands or controllers) or automatically (e.g., by using computer vision to identify an open area on the desk of sufficient size). In some implementations, an automatically identified dedicated space can be determined in relation to a position of a tracked keyboard or other tracked device on the real-world desk. In some implementations, a minimum amount of desk space can be required to set up the artificial reality working environment, and a warning can be provided if the specified dedicated space is not large enough.

At block 3006, process 3000 can set XR anchors/mappings in relation to the dedicated space identified at block 3004. XR anchors/mappings can be specific locations within the dedicated space for particular corresponding content items. For example a screen anchor/mapping can be set for a streamed version of the user's computer screen, anchors/mappings can be set for various UI controls to be placed around the dedicated space, various grids or surface patterns can be applied to the dedicated space to establish where content items will appear when added to the artificial reality working environment, etc. In some implementations, the XR anchors/mappings can be initially set to default locations and can be updated by the user to new desired locations.

At block 3008, process 3000 can set up a real-world space, physically separate from the desk area, for XR whiteboarding. The user can select the whiteboard space from the physical area around the desk. This whiteboard space can have specified footprint (e.g., 1.5 meters×2 meters) and process 3000 can instruct the user to clear the space of other objects. In some cases, process 3000 can warn the user if there is not enough space or if the selected space has objects which may endanger the user. In some implementations, the user can establish multiple of these whiteboard spaces adjacent to one another. This can allow the user to step between areas to use a large virtual whiteboard or different whiteboards, keeping the user's avatar, in the artificial reality working environment, centered in one of these areas without having to employ processing for fine-grained user position tracking.

In some implementations, the whiteboard space is required to be adjacent to a wall or other flat vertical surface, allowing the user to have a physical service to write against where the writings appear on the whiteboard in the artificial reality working environment. In other implementations, the user can specify a virtual plane proximate to the specified whiteboard area where the whiteboard will appear in the artificial reality working environment, without having a physical surface for the user to write on. In some implementations, the whiteboarding space can be associated with multiple virtual whiteboards that can be activated or transitioned between to facilitate different conversations. For example, different projects can each have a dedicated whiteboard or various teams can have a shared team whiteboard.

In some implementations, at least one whiteboard can correspond to an XR board that is part of a shared XR room environment. In various implementations, a user can switch between their desk area and whiteboard area by activating a control and/or by standing up and physically moving between the corresponding real-world areas. In some cases, the XR device can activate pass-through mode if the user stands up or looks away from the dedicated space, and/or their virtual computer screen, or other virtual objects in the artificial reality working environment. In some implementations, such a transition can be used to accomplish moving from an XR table in a shared XR room environment to an XR board such that the remote user can interact with the XR board via the whiteboard space mapped for the user.

Figure 31:
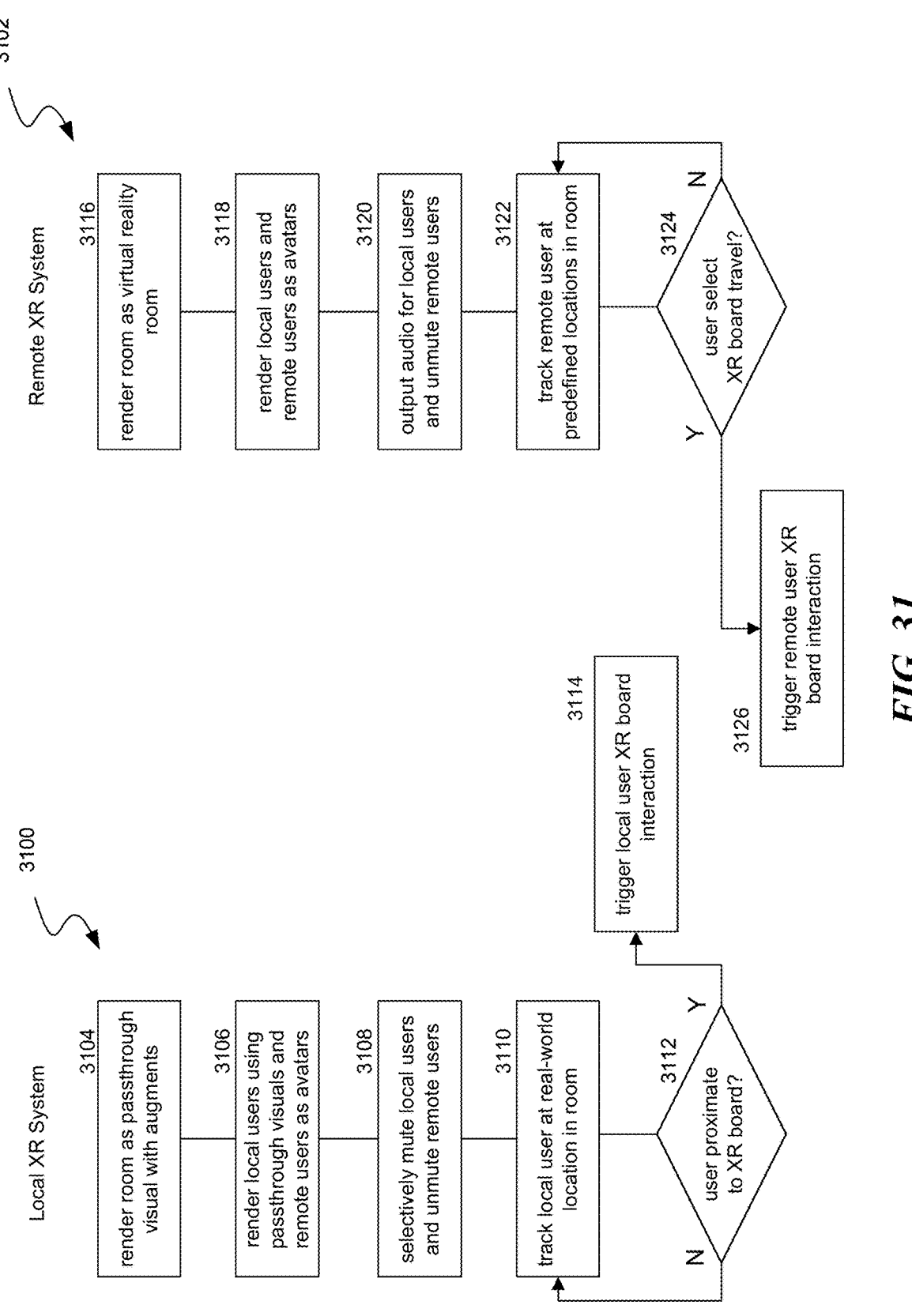
FIG. 31 is a flow diagram illustrating a process used in some implementations of the present technology for providing a shared XR environment comprising a local version for one or more local users and a remote version for one or more remote users.

FIG. 31 is a flow diagram illustrating processes 3100 and 3102 used in some implementations of the present technology for providing a shared XR environment comprising a local version for one or more local users and a remote version for one or more remote users. In some implementations, processes 3100 and 3102 can begin when a user initiates a shared XR room environment or application. In some implementations, process 3100 is performed by a first XR system that displays a local version of the shared XR environment to a local user and process 3102 is performed by a second XR system that displays a remote version of the shared XR environment to a remote user.

At block 3104, process 3100 can render, for the local version, the room as a passthrough of captured visuals of the real-world room augmented with XR objects or a mixed reality augmented with XR objects. For example, during the shared XR environment the first XR system can render the local version to a first local user. In some implementations, at least part of the real-world room is displayed in passthrough by the first XR system in the local version using a video capture of the real-world room, the passthrough video capture being augmented with an XR board displayed at a location that is mapped to predefined boundaries on a vertical surface within the real-world room.

At block 3106, process 3100 can render, for the local version, local users using captured passthrough visuals of the users in the real-world room and remotes users as avatars. For example, because local users are physically present in the real-world room, passthrough visuals can be used to represent the local users. On the other hand, remote users are not physically present in the real-world room, and thus remote users are represents using avatars.

At block 3108, process 3100 can selectively mute local users and unmute remote users. For example, audio for local users is selectively muted at the first XR system (e.g., local users can hear real-world passthrough audio in the room) and audio for remote users is output by the first XR system. Because the local users are co-located in the real-world room, real-world audio can be heard among the local users. Thus, audio for the local users from the first XR system is unnecessary and may cause confusion In some implementations, the first XR system outputs spatial audio according to the relative positions of the users in the shared XR environment. For example, directional audio filters can be applied to audio from a given remote user to adjust the frequencies that each ear hears so that audio can sound like its source is the relative position of the given user in the shared XR environment. Any other suitable technique can be used to implement spatial audio.

At block 3110, process 3100 can track the local user at a real-world location in the real-world room. For example, because local users are physical present in the real-world room that hosts the shared XR environment, local users can move about the room freely. In some implementations, two local users can be co-located in the real-world room including the first local user, and the local version of the shared XR environment displayed to the second local user can display passthrough visuals of the first local user at any location in the real-world room that the first local user chooses to move.

At block 3112, process 3100 can determine whether the first local user is proximate to an XR board, which is displayed as an augmented XR object in the local version. For example, in the local version the XR board is displayed at a location that is mapped to predefined boundaries on a vertical surface within the real-world room. The first local user can be detected as being proximate to the XR board when the first local user is physically within a threshold distance of the XR board. When the local user is proximate to an XR board, process 3100 can progress to block 3114. When the local user is not proximate to the XR board, process 3100 can loop back to block 3110 until the local user is proximate to the XR board.

At block 3114, process 3100 can trigger a local user XR board interaction for the first local user. For example, when an interaction with the XR board for a local user is triggered, the first local user can draw on the XR board using detected body movements. In some implementations, the detected body movements correspond to input that is rendered at the XR board. For example, the input can be rendered at the XR board for all users (e.g., local users and remote users). In some implementations, input from the first local user is rendered at the XR board when the first local user physically approaches the predefined boundaries on the vertical surface within the real-world room that are mapped to the XR board and performs detected body movements that correspond to the rendered input.

Moving to process 3102, at block 3116, process 3102 can render, for the remote version, the room as a virtual room. For example, a virtual room that corresponds to the real-world room can be displayed to the remote user by the second XR system. In some implementations, the display of the virtual room includes the XR board that dynamically renders the input that corresponds to the detected body movements of the first local user. For example, in the remote version, the second XR system can display the XR board at a relative location in the virtual room that corresponds to a relative location of the XR board in the passthrough video capture of the real-world room.

At block 3118, process 3102 can render, for the remote version, local users and remotes users as avatars (e.g., computer generated drawings, the portions of captured video depicting the user, a reconstructed hologram of the user, etc.). Because the remote user is not physically located in the real-world room, pass through visuals of the real-world room are not available. Accordingly, both remote users and local users are represented as avatars in the remote version of the shared XR environment.

At block 3120, process 3102 can output audio for local users and remote users. For example, the second XR system can output audio from both local users and remote users in the remote version, as real-world audio within the real-world room cannot be heard by remote users. In some implementations, the second XR system outputs spatial audio according to the relative positions of the users in the shared XR environment. For example, directional audio filters can be applied to audio from a given user (e.g., remote user or local user) to adjust the frequencies that each ear hears so that audio can sound like its source is the relative position of the given user in the shared XR environment. Any other suitable technique can be used to implement spatial audio.

At block 3122, process 3102 can track the remote user at predefined locations in the virtual room. For example, because the remote user is not physically present in the real-world room, the avatar that represents the remote user can be limited to predefined locations. As opposed to the local users, in some implementations, the remote users cannot move freely in the real-world room. In some implementations, the predefined locations include an XR table (e.g., seat assignment at the XR table), the XR board, or any other suitable XR object that the remote user can interact with.

At block 3124, process 3102 can determine whether the remote user has selected travel to the XR board. In various implementations, this can be through a selection of the XR board in a UI or by moving to a physical space in the remote user's area designated for interacting with the XR board. In some implementations, the remote user provides input to the second XR system to move about the predefined locations. For example, the remote user can interact with a panel displayed by the second XR system to confirm movements to the XR table (e.g., assigned seat at the XR table) and/or the XR board. When the remote user has selected travel to the XR board, process 3102 can progress to block 3126. When the remote user has not selected travel to the XR board, process 3102 can loop back to block 3122 until the remote user selects travel to the XR board.

At block 3126, process 3102 can trigger a remote user XR board interaction. For example, when an interaction with the XR board for a remote user is triggered, the remote user can draw on the XR board using detected body movements. In some implementations, the detected body movements correspond to input that is rendered at the XR board. For example, the input can be rendered at the XR board for all users (e.g., local users and remote users).

The remote user is located in a physical space that is remote from the real-world room that hosts the shared XR environment. In some implementations, additional predefined boundaries on another vertical surface at the remote physical space are mapped to the XR board. For example, input from the remote user can be dynamically rendered by the XR board when the remote user physically approaches the additional predefined boundaries on the other vertical surface within the other physical space that are mapped to the XR board and performs detected body movements that correspond to the rendered input.

In some implementations, the local version and the remote version of the shared XR environment include an XR table, and the XR table can be displayed using a passthrough video capture of a real-world table in the local version and as a virtual object in the remote version. For example, in the local version and the remote version, the one or more local users and one or more remote users comprise seat assignments at the XR table. In some implementations, the local version and the remote version display an XR screen relative to the XR table, and the XR screen displays a video capture of a video user of the shared XR environment.

In some implementations, a second local version of the shared XR environment is rendered by the third XR system to the second local user. The first local user can be represented by the passthrough video capture of the first local user when seated at the XR table in the second local version displayed by the third XR system, and the first local user can be represented by an avatar representation of the first local user when seated at the XR table in the remote version displayed by the second XR system.

In some implementations, volumetric video of the real-world room can be rendered to remote users during a shared XR environment (e.g., rather than a virtual representation of the real-world room). For example, volumetric video of a mapped real-world room can be captured (e.g., including objects and local users in the real-world room) and rendered to remote users during the shared XR environment. In some implementations, the volumetric video can be a three-dimensional representation of the real-world room and the people (e.g., local users) and objects (e.g., room objects) within the room. The volumetric video can be generated using video from several synchronized cameras (e.g., XR devices positioned in the real-world room) that capture the room from different perspectives. In some implementations, the field of view for the several cameras comprise overlapping portions.

In some implementations, images from the several cameras can be processed by a machine learning service (e.g., a pipeline of machine learning models) that estimates depth from the video images (e.g., pixel depth information, a mesh models, etc.). In another example, one or more of the cameras can be depth sensing cameras that capture the depth information. Any other suitable technique can be used to sense, estimate, or otherwise generate depth information for the captured video.

In some implementations, the captured video from the cameras (e.g., video with depth information, mesh models, etc.) can be stitched together to generate the three-dimensional representation of the real-world room. For example, the depth augmented video or mesh models generated can each represent a portion of the real-world room, and these portions can be stitched together in three dimensions to estimate the three-dimensional capture of the real-world room. In some implementations, one or more machine learning models can generate the combined three-dimensional room capture using the depth augmented video/mesh models (e.g., three-dimensional capture of individuals portions of the real-world room). Example machine learning models that can process the video captures of the cameras to generate the volumetric video can include deep neural networks, convolutional neural networks, encoder decoder networks, variational auto-encoder networks, and any other suitable models.

In some implementations, position and pose information for the positions of one or more remote users within a shared XR environment can be received (e.g., from the remote user'sxR systems). Each user'sxR system can track location and pose of an avatar that corresponds to the remote user, for example to manage interactions between the users' presence in the XR environment and virtual object(s) in the XR environment. In some implementations, the generated volumetric video of the real-world room can be processed to generate a XR rendering from the perspective of each remote user according to the position and pose information for the remote users. For example, the overall volumetric video for the real-world room can be filtered according to the perspective of the user's position information and pose (e.g., location in the shared XR environment and gaze). The filtered volumetric video (for each remote user) can represent a rendering of the real-world room from the perspective of each remote user. This rendering can be streamed to the remote users' XR systems such that the volumetric video of the real-world room from the perspective of the remote user can be rendered to the remote user during the shared XR environment. In the XR rendering from the perspective of each remote user, local users can be represented as captured video of their real-world selves.

In some implementations, the volumetric video rendered to the remote users can include one or more XR objects or augments. For example, the volumetric video can be processed to include an XR table, XR board (with writing), avatars of other users, or other suitable augment.

Figure 32:
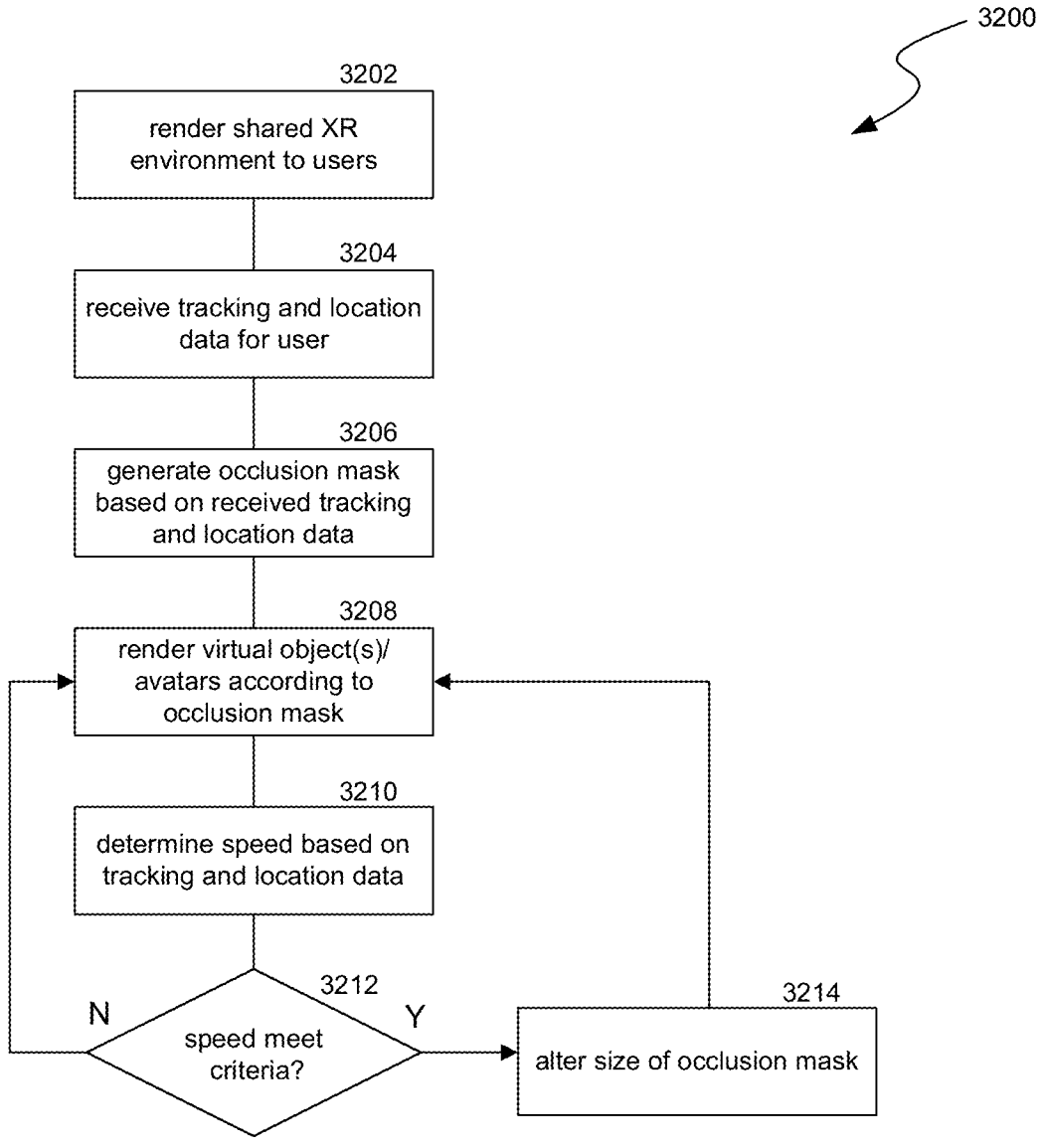
FIG. 32 is a flow diagram illustrating a process used in some implementations of the present technology for configuring an occlusion mask for an avatar in XR environment.

FIG. 32 is a flow diagram illustrating a process used in some implementations of the present technology for configuring an occlusion mask for an avatar in an artificial reality (XR) environment. In some implementations, process 3200 can begin when a user initiates a shared XR environment or application. In some implementations, process 3200 is performed by a first XR system that displays a local version of the shared XR environment to a first local user.

At block 3202, process 3200 can render a shared XR environment. For example, the first XR system can render the shared XR environment to the first user. In some implementations, the shared XR environment can correspond to a real-world room, where at least two users, including the first user, are local users in the real-world room (e.g., co-located in the real-world room). In some implementations, the local users view at least part of the shared XR environment in A) mixed reality or B) in passthrough using a video capture of the real-world room.

At block 3204, process 3200 can receive tracking location and pose data for an avatar in the XR environment. For example, the tracking location and pose data can be received from a second XR system of a second user of the local users. For example, the second XR system can track the location and pose data for the avatar using one or more sensors, captured video, or any other suitable technique used by an XR system to track user location and pose. In some implementations, the avatar of the second user is not rendered by the first XR system in the shared XR environment. For example, when two users are local, both users see each other using passthrough visuals or mixed reality visuals, thus their devices do not need to render avatars of each other.

At block 3206, process 3200 can generate an occlusion mask for the avatar. For example, the occlusion mask can be attached relative, in the XR environment, to the location and pose data for the second user, e.g., as indicated by the avatar data of the second user. In some implementations, the occlusion mask causes portions of virtual objects that are behind the occlusion mask, from the point of view of the first user, to not be rendered.

At block 3208, process 3200 can render a virtual object in the XR environment, where portions of the virtual object are not rendered due to the occlusion mask. For example, the generated occlusion mask causes at least part of the virtual object to not be displayed by the first XR system. In some implementations, the generated occlusion mask is a structured shape, such as an oval, square, other suitable polygon, etc., or is shaped according to the geometry of the avatar for the second user (i.e., matches the outline of the user and/or has a body shape and pose matching that of the avatar). In some implementations, the generated occlusion mask is larger than the avatar for the second user, e.g., the shape of the avatar but increased in size by 15%. For example, this can be to support an occlusion footprint larger than the avatar so that virtual objects/augments are not mistakenly rendered over the second user.

At block 3210, process 3200 can determine a movement speed for the second user based on the received tracking and location data. For example, the second XR system tracks an avatar for the second user according to sensed movements of the second user (e.g., within the real-world room). The received tracking and location data for the avatar of the second user can be used to determine the movement speed for the second user.

At block 3212, process 3200 can determine whether the determined speed for the second user meets a speed criteria. For example, the speed criteria can be a speed threshold (e.g., 6 ft/s, 8 ft/s, 10 ft/s, 12 ft/s, etc.) and the determined speed for the second user can be compared to the speed threshold. When the determined speed for the second user meets a speed criteria, process 3200 can progress to block 3214. When the determined speed for the second user does not meet the speed criteria, process 3200 can loop back to block 3208, where virtual object(s) and/or avatars can continue to be rendered according to the occlusion mask.

At block 3214, process 3200 can alter the size of the occlusion mask. For example, the occlusion mask can be enlarged (e.g., 105%, 110%, 115%, 120%, etc.) when the movement speed for the second user meets the speed criteria. In some implementations, the size of the occlusion mask grows larger as the determined movement speed increases.

In some implementations, a first occlusion mask can be generated for a user avatar and a second occlusion mask can be generated for a virtual object. For example, a second virtual object can be rendered by the first XR system in the shared XR environment. In some implementations, a second occlusion mask attached relative, in the XR environment, to the location and geometry of the second virtual object can be generated. For example, the second occlusion mask can cause portions of user avatars or virtual objects that are behind the second occlusion mask, from the point of view of the first user, to not be rendered. In some implementations, the generated second occlusion mask causes at least part of a virtual object or a rendered user avatar (e.g., for a remote user) to not be rendered.

Figure 33:
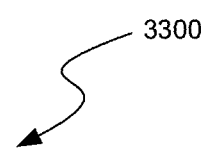
FIG. 33 is a flow diagram illustrating a process used in some implementations of the present technology for configuring an occlusion mask for a virtual object in an artificial reality (XR) environment.
Figure 33:
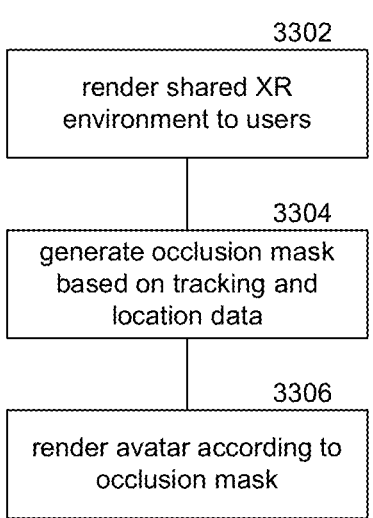

FIG. 33 is a flow diagram illustrating a process used in some implementations of the present technology for configuring an occlusion mask for a virtual object in an artificial reality (XR) environment. In some implementations, processes 3300 can begin when a user initiates a shared XR room environment or application.

At block 3302, process 3300 can render a shared XR environment. For example, the first XR system can render the shared XR environment to the first user. In some implementations, the shared XR environment can correspond to a real-world room, where at least a first user is a local user (e.g., physically located in the real-world room) and a second user is a remote user (e.g., physically located remote to the real-world room). In some implementations, the local user can view at least part of the shared XR environment in A) mixed reality or B) in passthrough using a video capture of the real-world room. In some implementations, the remote user is represented as a rendered avatar in the shared XR environment rendered to the local user.

In some implementations, a virtual object can be rendered at a particular location in the shared XR environment. For example, the first XR system can render a virtual object in the shared XR environment (to the first user) at the particular location. The virtual object can be rendered as an augment to the passthrough video capture of the real-world room or mixed reality visual of the real-world room.

At block 3304, process 3200 can generate an occlusion mask for the virtual object. For example, the occlusion mask can be attached relative, in the XR environment, to the location of the virtual object. In some implementations, the occlusion mask causes portions of the avatar of the second user that are behind the occlusion mask, from the point of view of the first user, to not be rendered. For example, each tracked avatar and virtual object can have a position in the artificial reality environment, and when those positions indicates an occlusion mask is between a viewing user and another virtual object, the portion occluded by the occlusion mask is not rendered.

At block 3306, process 3200 can render the avatar for the second user in the XR environment, where portions of the avatar for the second user are not rendered due to the occlusion mask. For example, the generated occlusion mask causes at least part of the representation of the second user to not be displayed by the first XR system. In some implementations, the generated occlusion mask is a structured shape, such as an oval, square, other suitable polygon, etc., or is shaped according to the geometry of the virtual object.

In some implementations, the generated occlusion mask is larger than the virtual object, for example to support an occlusion footprint larger than the virtual object so that user representations or other virtual objects are not mistakenly rendered over the virtual object.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for providing a shared XR experience comprising a local version for one or more local users, wherein a remote version is provided for one or more remote users, the method comprising:

rendering, during the shared XR experience by a first XR system, the local version, wherein, in the local version:

the one or more remote users are represented using one or more avatars and the one or more local users are represented using a passthrough video capture of the one or more local users in a real-world room, and at least part of the real-world room is displayed in passthrough by the first XR system using a video capture of the real-world room;

wherein the remote version is rendered, during the shared XR experience, by a second XR system, and in the remote version:

the one or more remote users and the one or more local users are represented using avatars, and a virtual room that corresponds to the real-world room is displayed by the second XR system.

2. The method of claim 1, wherein, in the remote version, the second XR system displays an XR presentation board at a relative location, in the virtual room, that corresponds to a relative location of an XR presentation board in the passthrough video capture of the real-world room.

3. The method of claim 1, wherein the local version and the remote version each include an XR table, and wherein a first version of the XR table is displayed using a passthrough video capture of a real-world table in the local version, and wherein a second version of the XR table is displayed as a virtual object in the remote version.

4. The method of claim 3, wherein the local version and the remote version each display an XR screen relative to the XR table, and wherein the XR screen displays a video of a video call user who is participating in the shared XR environment.

5. The method of claim 3, wherein, in the local version, each of the one or more local users and each one or more remote users have seat assignments at the XR table, and wherein, in the remote version, each of the one or more local users and each one or more remote users have the same seat assignments at the XR table as in the local version.

6. The method of claim 1, wherein a second local version of the shared XR environment is rendered by a third XR system to a second user, a first local user of the first XR system is represented by passthrough video capture of the first local user in the second local version displayed by the third XR system, and the first local user is represented by an avatar representation of the first local user in the remote version displayed by the second XR system.

7. The method of claim 1, wherein input from the first remote user is rendered in relation to an XR presentation board when the first remote user is within predefined boundaries that are mapped to the XR presentation board and performs detected movements that correspond to the input.

8. The method of claim 1, wherein audio output, captured by the first XR system and provided via the second XR system, comprises spatial audio based on relative positioning, defined between a first user of the one or more local users and a second second user of the one or more remote users, in the shared XR environment.

9. A computer-readable storage medium storing instructions, for providing a shared XR experience comprising a local version for one or more local users, wherein a remote version is provided for one or more remote users, the instructions, when executed by a computing system, cause the computing system to:

render, during the shared XR experience by a first XR system, the local version, wherein, in the local version:

the one or more remote users are represented using one or more avatars and the one or more local users are represented using a passthrough video capture of the one or more local users in a real-world room, and at least part of the real-world room is displayed in passthrough by the first XR system using a video capture of the real-world room;

wherein the remote version is rendered, during the shared XR experience, by a second XR system, and in the remote version:

the one or more remote users and the one or more local users are represented using avatars, and a virtual room that corresponds to the real-world room is displayed by the second XR system.

10. The computer-readable storage medium of claim 9, wherein, in the remote version, the second XR system displays an XR presentation board at a relative location, in the virtual room, that corresponds to a relative location of an XR presentation board in the passthrough video capture of the real-world room.

11. The computer-readable storage medium of claim 9, wherein the local version and the remote version each include an XR table, and wherein a first version of the XR table is displayed using a passthrough video capture of a real-world table in the local version, and wherein a second version of the XR table is displayed as a virtual object in the remote version.

12. The computer-readable storage medium of claim 11, wherein the local version and the remote version each display an XR screen relative to the XR table, and wherein the XR screen displays a video of a video call user who is participating in the shared XR environment.

13. The computer-readable storage medium of claim 11, wherein, in the local version, each of the one or more local users and each one or more remote users have seat assignments at the XR table, and wherein, in the remote version, each of the one or more local users and each one or more remote users have the same seat assignments at the XR table as in the local version.

14. The computer-readable storage medium of claim 9, wherein a second local version of the shared XR environment is rendered by a third XR system to a second user, a first local user of the first XR system is represented by passthrough video capture of the first local user in the second local version displayed by the third XR system, and the first local user is represented by an avatar representation of the first local user in the remote version displayed by the second XR system.

15. The computer-readable storage medium of claim 9, wherein input from the first remote user is rendered in relation to an XR presentation board when the first remote user is within predefined boundaries that are mapped to the XR presentation board and performs detected movements that correspond to the input.

16. The computer-readable storage medium of claim 9, wherein audio output, captured by the first XR system and provided via the second XR system, comprises spatial audio based on relative positioning, defined between a first user of the one or more local users and a second second user of the one or more remote users, in the shared XR environment.

17. A computing system, for providing a shared XR experience comprising a local version for one or more local users, wherein a remote version is provided for one or more remote users, the computing system comprising:

one or more processors; and one or more memories storing instructions that, when executed by the one or more processors, cause the computing system to:

render, during the shared XR experience by a first XR system, the local version, wherein, in the local version:

the one or more remote users are represented using one or more avatars and the one or more local users are represented using a passthrough video capture of the one or more local users in a real-world room, and at least part of the real-world room is displayed in passthrough by the first XR system using a video capture of the real-world room;

wherein the remote version is rendered, during the shared XR experience, by a second XR system, and in the remote version:

the one or more remote users and the one or more local users are represented using avatars, and a virtual room that corresponds to the real-world room is displayed by the second XR system.

18. The computing system of claim 17, wherein the local version and the remote version each include an XR table, and wherein a first version of the XR table is displayed using a passthrough video capture of a real-world table in the local version, and wherein a second version of the XR table is displayed as a virtual object in the remote version.

19. The computing system of claim 17, wherein the local version and the remote version each display an XR screen, and wherein the XR screen displays a video of a video call user who is participating in the shared XR environment.

20. The computing system of claim 17, wherein a second local version of the shared XR environment is rendered by a third XR system to a second user, a first local user of the first XR system is represented by passthrough video capture of the first local user in the second local version displayed by the third XR system, and the first local user is represented by an avatar representation of the first local user in the remote version displayed by the second XR system.

* * * * *